United States Patent
Uotani

(10) Patent No.: US 8,432,556 B2
(45) Date of Patent: Apr. 30, 2013

(54) INFORMATION PROCESSING APPARATUS, PRINT SETTING METHOD, AND COMPUTER-READABLE MEDIUM

(75) Inventor: Kenichiro Uotani, Ichikawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 1264 days.

(21) Appl. No.: 11/669,737

(22) Filed: Jan. 31, 2007

(65) Prior Publication Data

US 2007/0195336 A1    Aug. 23, 2007

(30) Foreign Application Priority Data

Feb. 20, 2006  (JP) .................................. 2006-042551
Jun. 30, 2006  (JP) .................................. 2006-182580

(51) Int. Cl.
*G06F 3/12*  (2006.01)
(52) U.S. Cl.
USPC .......................................... 358/1.13; 358/1.2
(58) Field of Classification Search ........................ None
See application file for complete search history.

(56) References Cited

U.S. PATENT DOCUMENTS

| | | | |
|---|---|---|---|
| 6,775,488 B2 * | 8/2004 | Sawada | 399/45 |
| 6,847,466 B1 * | 1/2005 | Gazdik et al. | 358/1.15 |
| 7,148,989 B2 * | 12/2006 | Hitaka | 358/1.16 |
| 2002/0054343 A1 * | 5/2002 | Nagata | 358/1.15 |

FOREIGN PATENT DOCUMENTS

| | | |
|---|---|---|
| JP | 11-249856 A | 9/1999 |
| JP | 2001-191618 A | 7/2001 |
| JP | 2004-268379 A | 9/2004 |
| JP | 2004-287496 A | 10/2004 |

* cited by examiner

*Primary Examiner* — Twyler Haskins
*Assistant Examiner* — Lennin RodriguezGonzalez
(74) *Attorney, Agent, or Firm* — Canon USA, Inc., IP Division

(57) ABSTRACT

An information processing apparatus includes a determination unit determining whether a sheet set in a print condition is included in a list of printable sheets supported by a printing apparatus, an acquisition unit obtaining a sheet size supported by the printing apparatus if the determination unit determines that the sheet set in the print condition is not included in the list of printable sheets, and a print processing unit executing print processing based on the sheet size obtained by the acquisition unit.

9 Claims, 17 Drawing Sheets

FIG. 3

SUPPORT SHEET INFORMATION TABLE

| SHEET ID | SHEET NAME | WIDTH (mm) | LENGTH (mm) | PREDETERMINED SHEET |
|---|---|---|---|---|
| 1 | LETTER | 215.9 | 279.4 | × |
| 3 | A4 | 210 | 297 | ○ |
| 5 | B5 | 182 | 257 | × |
| 6 | POSTCARD | 100 | 148 | × |
| 100 | L | 89 | 127 | × |
| 101 | 2L | 127 | 178 | × |
| 256 | CUSTOM SHEET | — | — | × |

CUSTOM SHEET INFORMATION TABLE 401  402

| SHEET WIDTH | | SHEET LENGTH | |
|---|---|---|---|
| MIN (mm) | MAX (mm) | MIN (mm) | MAX (mm) |
| 50 | 215.9 | 60 | 420 |

| SHEET ID | SHEET NAME | WIDTH (mm) | LENGTH (mm) |
|---|---|---|---|
| 1 | LETTER | 215.9 | 279.4 |
| 2 | A3 | 297 | 420 |
| 3 | A4 | 210 | 297 |
| 4 | B4 | 250 | 354 |
| 5 | B5 | 182 | 257 |
| 6 | POSTCARD | 100 | 148 |
| 7 | DOUBLE POSTAL CARD | 200 | 148 |
| ⋮ | ⋮ | ⋮ | ⋮ |
| 100 | L | 89 | 127 |
| 101 | 2L | 127 | 178 |
| 102 | L-SIZE PHOTO PAPER | 89 | 127 |

FIG. 12

SUPPORT SHEET LIST

| SHEET | WIDTH (mm) | LENGTH (mm) | PREDETERMINED SHEET |
|---|---|---|---|
| LETTER | 215.9 | 279.4 | × |
| A4 | 210 | 297 | ○ |
| B5 | 182 | 257 | × |
| POSTCARD | 100 | 148 | × |
| L | 89 | 127 | × |
| 2L | 127 | 178 | × |
| CUSTOM SHEET | — | — | × |

PRINT TICKET SETTING INFORMATION TABLE

| SHEET | NAME OF SETTING VALUE | NAMESPACE |
|---|---|---|
| LETTER | NorthAmericaLetter | http : / / schemas. com / printing / printschemakeywords |
| A3 | ISOA3 | http : / / schemas. com / printing / printschemakeywords |
| A4 | ISOA4 | http : / / schemas. com / printing / printschemakeywords |
| B4 | JISB4 | http : / / schemas. com / printing / printschemakeywords |
| B5 | JISB5 | http : / / schemas. com / printing / printschemakeywords |
| POSTCARD | JapanHagakiPostcard | http : / / schemas. com / printing / printschemakeywords |
| DOUBLE POSTAL CARD | JapanHagakiPostcard | http : / / schemas. com / printing / printschemakeywords |
| L | JapanLPhoto | http : / / www. aaa. com / ns / printschema |
| 2L | Japan2LPhoto | http : / / www. aaa. com / ns / printschema |
| ......... | ......... | ......... |
| CUSTOM SHEET | CustomMediaSize | http : / / schemas. com / printing / printschemakeywords |

1300

1400

```
<psf.PrintCapabilities
    xmlnspsf= "http : / / schemas.com / printing / printschemaframework "
    xmlnsxsi= "http : / / www.w3.org / XMLSchema-instance "
    xmlnsxsd= "http : / /www.w3.org / XMLSchema "
    version= " 1 "
    xmlnsns0000= "http : / /www.aaa.com / ns / printschema "
    xmlnspsk= "http : / /schemas.com / printing / printschemakeywords ">
```
— 1401

```
<psf.Feature name= "psk : PageMediaSize ">
    <psf.Property name= "psk : DisplayName ">
        <psf.Value xsitype= "xsd : string "> SHEET SIZE < / psf.Value>
    < / psf.Property>
```
— 1402

```
    <psf.Option name= "psk : NorthAmericaLetter ">
        <psf.Property name= "psk : DisplayName ">
            <psf.Value xsitype= "xsd : string "> LETTER < / psf.Value>
        < / psf.Property>
        <psf.ScoredProperty name= "psk : MediaSizeWidth ">
            <psf.Value xsitype= "xsd : integer "> 215900 < / psf.Value>
        < / psf.ScoredProperty>
        <psf.ScoredProperty name= "psk : MediaSizeHeight ">
            <psf.Value xsitype= "xsd : integer "> 279400 < / psf.Value>
        < / psf.ScoredProperty>
    < / psf.Option>
```
— 1403

```
    <psf.Option name= "psk : ISOA4 ">
    ----------------
    < / psf.Option>
    <psf.Option name= "psk : JISB5 ">
    ----------------
    < / psf.Option>
    <psf.Option name= "psk : JapanHagakiPostcard ">
    ----------------
    < / psf.Option>
    <psf.Option name= "psk : JapanLPhoto ">
    ----------------
    < / psf.Option>
    <psf.Option name= "psk : Japan2LPhoto ">
    ----------------
    < / psf.Option>
    <psf.Option name= "psk : CustomMediaSize ">
    ----------------
    < / psf.Option>
< / psf.Feature>
< / psf.PrintCapabilities>
```

```
<psf.PrintTicket
    xmlnspsf= "http : / / schemas.com / printing / printschemaframework "
    xmlnsxsi= "http : / / www.w3.org / XMLSchema-instance "
    xmlnsxsd= "http : / /www.w3.org / XMLSchema "
    version= " 1 "
    xmlnsns0000= "http : / /www.aaa.com / ns / printschema "
    xmlnspsk= "http : / /schemas.com / printing / printschemakeywords ">

<psf.Feature name= "psk : PageMediaSize ">
    <psf.Option name= "psk : NorthAmericaLetter ">
    <psf.ScoredProperty name= "psk : MediaSizeWidth ">
        <psf.Value xsitype= "xsd : integer "> 215900 < / psf.Value>
    < / psf.ScoredProperty>
    <psf.ScoredProperty name= "psk : MediaSizeHeight ">
        <psf.Value xsitype= "xsd : integer "> 279400 < / psf.Value>
    < / psf.ScoredProperty>
    < / psf.Option>
< / psf.Feature>
< / psf.PrintTicket>
```

FIG. 17

FD/CD-ROM OR OTHER STORAGE MEDIUM

| DIRECTORY INFORMATION |
|---|
| PROGRAM CODE CORRESPONDING TO FLOWCHART STEPS IN FIG. 6 |
| PROGRAM CODE CORRESPONDING TO FLOWCHART STEPS IN FIG. 7 |
| PROGRAM CODE CORRESPONDING TO FLOWCHART STEPS IN FIG. 8 |
| PROGRAM CODE CORRESPONDING TO FLOWCHART STEPS IN FIG. 9 |
| PROGRAM CODE CORRESPONDING TO FLOWCHART STEPS IN FIG. 10 |
| PROGRAM CODE CORRESPONDING TO FLOWCHART STEPS IN FIG. 11 |
| PROGRAM CODE CORRESPONDING TO FLOWCHART STEPS IN FIG. 16 |
|  |

INFORMATION PROCESSING APPARATUS, PRINT SETTING METHOD, AND COMPUTER-READABLE MEDIUM

BACKGROUND OF THE INVENTION

1. Field of the Invention

The present invention relates to sheet setting processing in a print control apparatus that allows an application to designate print setting of print data.

2. Description of the Related Art

A print control apparatus of an information processing apparatus, such as a personal computer, can control a printing apparatus that executes print processing of a document or an image produced by a document editing application or an image editing application.

An application installed on an information processing apparatus can obtain a list of selectable output sheets at arbitrary timing and set an output sheet as one of print conditions for a printing apparatus. A user can select a desired sheet from the obtained list of output sheets and set an output sheet at arbitrary timing.

An output sheet setting method by an application can be selected among several options: e.g., setting based on a sheet identification (ID), setting based on a sheet name, and setting based on a sheet size (sheet width and sheet length).

The sheet ID is an identifier widely used to designate an output sheet. Even if a sheet size (sheet width and sheet length) is the same, a sheet ID allocated to a sheet may be different depending on a printing apparatus. Therefore, an application obtains a list of selectable output sheets when an actually used printing apparatus is determined and selects, as sheet setting, a sheet ID of a desirable sheet from the obtained output sheet list.

In addition to the above-mentioned setting methods, print conditions can be set according to a predetermined format defined by an Extensible Markup Language (XML) schema. The format defined by an XML schema is generally referred to as "print schema", and the print conditions set according to a print schema can be referred to as "print ticket."

Similar to the above-mentioned sheet ID-oriented sheet setting, when an output sheet is set in a print ticket according to a print schema, setting values allocated to a sheet may be different depending on a printing apparatus even though a sheet size (sheet width and sheet length) is the same. Therefore, an application obtains a list of selectable output sheets when an actually used printing apparatus is determined and selects, as sheet setting, setting values of a desirable sheet from the obtained output sheet list.

When the output sheet setting is completed according to any one of the above-described setting methods and a print execution is instructed to a printing apparatus, the print control apparatus determines whether a selected output sheet is supported by the printing apparatus.

If an output sheet is supported by the printing apparatus, the print control apparatus causes the printing apparatus to execute image processing according to the sheet setting designated by an application.

On the other hand, if an output sheet is not supported by the printing apparatus, the print control apparatus cancels and rewrites the sheet setting designated by an application into predetermined sheet setting and causes the printing apparatus to execute image processing according to the predetermined sheet setting.

Furthermore, when the output sheet setting is a sheet size (sheet width and sheet length)-oriented setting, the sheet size designated by an application may exceed a maximum sheet width or a maximum sheet length supported by a printing apparatus. In this case, the print control apparatus reduces the size of a print image based on the maximum sheet width and the maximum sheet length supported by a printing apparatus (refer to Japanese Patent Application Laid-open No. 2004-287496).

As mentioned above, if an output sheet set by an application is supported by a printing apparatus, the printing apparatus executes image processing according to the sheet setting designated by the application as intended by a user.

However, if an output sheet set by an application is not supported by a printing apparatus, the printing apparatus executes image processing according to rewritten sheet setting (i.e., predetermined sheet setting). Thus, print data may be lost and the size of a print image may be reduced. As a result, a print result may not be obtained as intended by a user.

In this case, obtaining a list of output sheets supported by a printing apparatus immediately before starting print processing of edited document (or image) data and setting an output sheet from the obtained output sheet list is desirable to exclude any output sheet not supported by a printing apparatus.

However, the data layout region of a document or an image is generally determined according to the sheet setting. The determination of an output sheet is accomplished before creating or editing document data or image data.

The print processing may be started immediately after an output sheet is determined and editing document (or image) data is completed. On the other hand, the edited data may be stored in a file together with the sheet setting for print output at later timing.

In the latter case, the file may be distributed to another user. The file may be copied in another information processing apparatus. The printing apparatus may be replaced with a new machine. Therefore, the printing apparatus selected in editing the document (or image) data may be different from a printing apparatus actually executing the print processing.

If the printing apparatus selected in the output sheet setting is different from the printing apparatus actually executing the print processing, the printing apparatus is required to execute print processing with an output sheet not supported by the printing apparatus. Thus, the above-mentioned problems will arise.

In an attempt to avoid the above-mentioned problems and obtain an intended print result, a user may be requested to manually select an output sheet supported by an actually used printing apparatus before starting print processing. However, changing the sheet setting may require changing the layout region of document data or image data. As a result, a user may be required to re-edit the document data or image data.

SUMMARY OF THE INVENTION

Exemplary embodiments of the present invention are directed to a technique for finding an appropriate sheet from output sheets supported by a printing apparatus based on the contents of sheet setting designated by an application and producing a print output as intended by a user.

According to an aspect of the present invention, an information processing apparatus includes a determination unit configured to determine whether a sheet set in a print condition is included in a list of printable sheets supported by a printing apparatus; an acquisition unit configured to obtain a sheet size supported by the printing apparatus if the determination unit determines that the sheet set in the print condition is not included in the list of printable sheets; and a print processing unit configured to execute print processing based on the sheet size obtained by the acquisition unit.

According to another aspect of the present invention, a method includes determining whether a sheet set in a print condition is included in a list of printable sheets supported by a printing apparatus; obtaining a sheet size supported by the printing apparatus if the sheet set in the print condition is not included in the list of printable sheets; and executing print processing based on the obtained sheet size.

According to yet another aspect of the present invention, an information processing apparatus includes a first determination unit configured to determine whether a sheet set in sheet setting is included in a list of printable sheets supported by a printing apparatus; a second determination unit configured to determine whether the sheet set in the sheet setting is included in a list of sheets registered in an operating system if the first determination unit determines that the sheet set in the sheet setting is not included in the list of printable sheets; an acquisition unit configured to obtain a sheet size corresponding to a sheet included in the list of sheets registered in the operating system if the second determination unit determines that the sheet set in the sheet setting is included in the list of sheets registered in the operating system; and a print processing unit configured to execute print processing based on the sheet size obtained by the acquisition unit.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 3 is an illustration of an exemplary support sheet information table stored in a user interface driver (UID) shown in FIG. 2.

FIG. 4 is an illustration of an exemplary custom sheet information table stored in the UID shown in FIG. 2.

FIG. 5 is an illustration of an exemplary registered sheet information table stored in a graphics device interface (GDI) shown in FIG. 2.

FIG. 12 is an illustration of an exemplary support sheet information table stored in the UID shown in FIG. 2.

FIG. 13 is an illustration of an exemplary print ticket setting information table stored in the UID shown in FIG. 2.

FIG. 14 is an illustration of an exemplary settable sheet list produced by the UID and sent to an application (AP) shown in FIG. 2.

FIG. 15 is an illustration of an exemplary print ticket (print conditions) set by the AP shown in FIG. 2.

FIG. 17 is a memory map of a storage medium that stores various data processing programs readable by the information processing apparatus according to an exemplary embodiment.

DETAILED DESCRIPTION OF THE EMBODIMENTS

Figure 1:
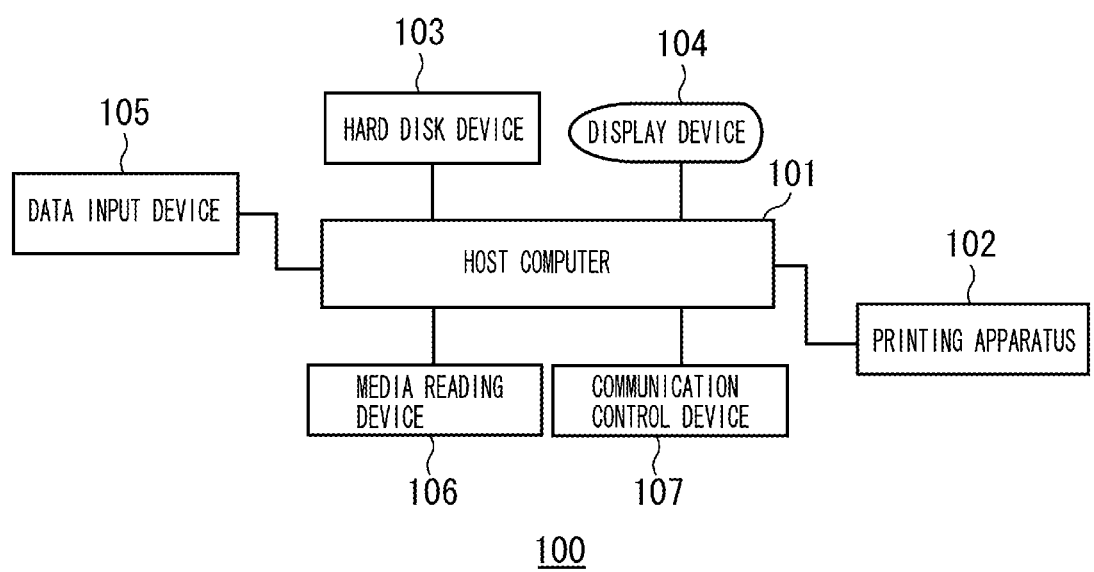
FIG. 1 is a block diagram illustrating a print system including an information processing apparatus according to a first exemplary embodiment of the present invention.

The following description of exemplary embodiments is merely illustrative in nature and is in no way intended to limit the invention, its application, or uses.

Processes, techniques, apparatus, and methods as known by one of ordinary skill in the art may not be discussed in detail but are intended to be part of the enabling description where appropriate.

For example, certain circuitry for image processing, data processing, and other uses may not be discussed in detail. However these systems and the methods to fabricate these system as known by one of ordinary skill in the relevant art is intended to be part of the enabling disclosure herein where appropriate.

It is noted that throughout the specification, similar reference numerals and letters refer to similar items in the following figures, and thus once an item is defined in one figure, it may not be discussed for following figures.

Exemplary embodiments will be described in detail below with reference to the drawings.

First Exemplary Embodiment

FIG. 1 is a block diagram illustrating a print system 100 including an information processing apparatus according to a first exemplary embodiment of the present invention.

The print system 100 according to the first exemplary embodiment executes the following processing to enable a printing apparatus to print, on a sheet, a document or an image produced by an application installed on a personal computer. In short, the print system 100 can perform a print control of print data according to sheet setting set by an application.

In the first exemplary embodiment, an information processing apparatus executes sheet condition finalization processing. The first exemplary embodiment can be implemented as a print control apparatus incorporated in an information processing apparatus.

The print system 100 according to the first exemplary embodiment has the following arrangement and performs the following actions.

In FIG. 1, the print system 100 includes a host computer 101 which is connected to a printing apparatus 102, a hard disk device 103, a display device 104, a data input device 105, a media reading device 106, and a communication control device 107.

The host computer 101 executes predetermined system program(s) to control and monitor various actions of the print system 100.

More specifically, the host computer 101 includes a central processing unit (CPU), a random access memory (RAM), and a read only memory (ROM) disposed on a system board. The CPU of the host computer 101 reads a processing program from a built-in memory or the hard disk device 103 and executes the read program to control actions performed by the print system 100.

The host computer 101 executes various processing programs stored in the hard disk device 103. The host computer 101 can install various applications to produce print data according to the first exemplary embodiment.

The storage device storing a processing program (program code) for realizing operations and actions according to the first exemplary embodiment is not limited to the hard disk device 103 or a built-in memory. For example, a portable recording medium (e.g., CD-ROM or flexible disk) can be used to store the processing program (program code). In this case, the host computer 101 of the print system 100 can read, via the media reading device 106 or the communication control device 107, the processing program from a portable recording medium and install the read program on the hard disk device 103.

The first exemplary embodiment uses Windows® as an operating system (OS) for the host computer 101. However, any other operating system can be used.

The printing apparatus 102 receives print data and setting information including print conditions from the host computer 101, and executes predetermined print processing to output a print (form an image) on a print sheet based on the print data.

If the host computer 101 can produce a raster image, the printing apparatus 102 can receive raster image data from the host computer 101 and produce a print output. Furthermore, the printing apparatus 102 can receive and analyze page description language (PDL) data to produce a raster image for print output.

The printing apparatus 102 is, for example, a serial printer, a page printer, or other electronic copying printer. The printing apparatus 102 and the host computer 101 are, for example, connected via a stand-alone connection or a network connection.

The display device 104 can display a predetermined window according to an instruction from the host computer 101 that executes the system programs and various applications.

The data input device 105 includes a keyboard, a mouse, or other pointing devices, to allow a user to input various data and instructions. The host computer 101 can receive the input data and instructions from the data input device 105. For example, the data input device 105 sends setting contents (i.e., print conditions) of the printing apparatus 102, if input by a user, to the host computer 101.

The media reading device 106 can be a CD-ROM drive or a flexible disk (FD) drive that reads data and information from a recording medium (e.g., CD-ROM or FD). The media reading device 106 supplies the read data and information to the host computer 101.

The communication control device 107 is, for example, a connection interface that controls communications between the print system 100 and an external network. The printing apparatus 102 can be connected via the communication control device 107 and the network to the computer 101.

Figure 2:
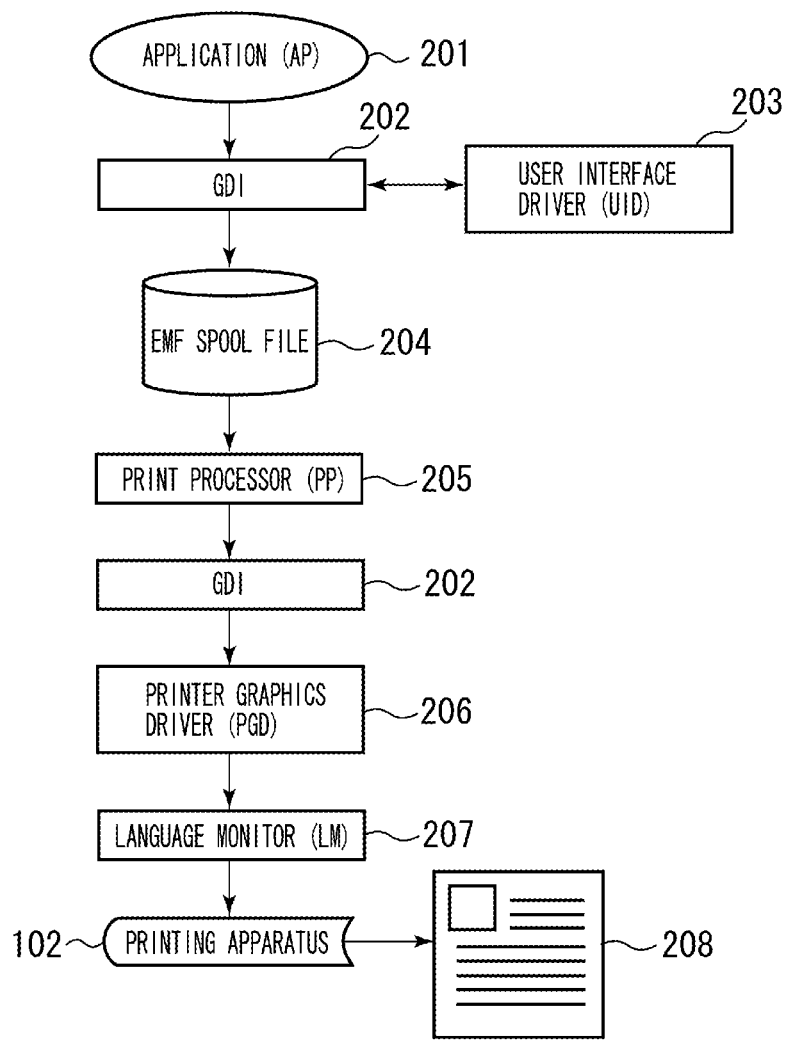
FIG. 2 is a block diagram illustrating a print control function of a host computer shown in FIG. 1.

FIG. 2 is a block diagram illustrating a print control function of the host computer 101 shown in FIG. 1. The print system 100 executes a predetermined processing program to realize the print control function.

In FIG. 2, the print control function of the host computer 101 can be realized by seven print function processing sections.

More specifically, the print control function of the host computer 101 can be realized by an application (AP) 201, a graphics device interface (GDI) 202, a user interface driver (UID) 203, an Enhanced Metafile Format (EMF) spool file 204, a print processor (PP) 205, a printer graphics driver (PGD) 206, and a language monitor (LM) 207.

The following is included in the print control function of the host computer 101.

AP 201 has the capability of setting, via GDI 202, print conditions of the printing apparatus (printer) 102.

For example, AP 201 can set sheet and other print conditions.

UID 203 has the capability of instructing, via GDI 202, a list of options selectable in respective print conditions to AP 201.

PP 205 has the capability of processing print data stored in the EMF spool file 204 on a page-by-page basis.

PGD 206 has the capability of converting print data into bit map data (raster image data) for print output by the printing apparatus 102.

LM 207 performs bidirectional communications with the printing apparatus 102. LM 207 has the capability of obtaining information relating to the printing apparatus 102 and causing the display device 104 to display the obtained information. Furthermore, LM 207 has the capability of transferring bit map data produced by PGD 206 to the printing apparatus 102. The transfer method of the bit map data can be appropriately selected based on a memory capacity of the printing apparatus 102 or depending on an engine controller.

The host computer 101 executes sequential actions for realizing the print control function.

First, AP 201 sends a request to UID 203 via GDI 202 to obtain a list of sheets settable in the printing apparatus 102.

UID 203 receives a request of the list from AP 201. UID 203 obtains a requested settable sheet list by referring to a support sheet information table stored beforehand in UID 203 and sends the obtained settable sheet list to AP 201. The support sheet information table can be stored in a storage device of the host computer 101 or in the hard disk device 103. The support sheet information table can be updated in response to a version change of AP 201.

AP 201 receives the settable sheet list from UID 203 and determines sheet setting based on sheet setting pre-stored in an arbitrary document, user's operation instructions, or an inherent determination method used in AP 201.

The sheet setting method by AP 201 according to the first exemplary embodiment is selectable among "sheet ID-oriented setting", "sheet name-oriented setting", and "custom sheet size (sheet width and sheet length)-oriented setting."

Subsequently, AP 201 creates or edits an arbitrary document according to user's operation instructions and sets print conditions for the printing apparatus 102. Then, AP 201 instructs printing of document data (print data).

GDI 202 receives a print execution instruction from AP 201, and instructs a print start event to UID 203 together with the print conditions set for the printing apparatus 102.

UID 203 receives the print conditions set for the printing apparatus 102, and determines whether instructed print setting contents can be processed by the printing apparatus 102.

If UID 203 determines that the instructed print setting contents cannot be processed by the printing apparatus 102, the UID 203 partly changes the print setting contents so as to be processed by the printing apparatus 102 and fixes the print conditions. This processing is referred to as "print condition finalization processing."

Subsequently, AP 201 sends the document data (print data), via GDI 202, to the EMF spool file 204. The EMF spool file 204 stores the document data (print data).

UID 203 causes the EMF spool file 204 to store, beforehand, the print conditions set for the printing apparatus 102.

PP 205 obtains the print setting contents and the print data from the EMF spool file 204, and supplies the print setting contents and the print data to PGD 206 on a page-by-page basis.

PGD 206 applies image processing to the print page data supplied from PP 205, based on a graphics drawing command produced by GDI 202 and print setting contents instructed from GDI 202. Then, PGD 206 produces bit map data (hereinafter, referred to as "print image data") for print output.

LM 207 receives the print image data produced by PGD 206 and supplies the received print image data, via an interface used for data transfer from the host computer 101 to the printing apparatus 102.

The printing apparatus 102 produces a print output on a sheet 208 based on the print image data supplied from LM 207.

Next, the print condition finalization processing performed by UID 203 according to the first exemplary embodiment is described below in detail with respect to sheet setting.

UID 203 receives, from GDI 202, an instruction relating to sheet setting as print conditions in the printing apparatus 102. If an instructed sheet setting method is "custom sheet size (sheet width and sheet length)-oriented setting", UID 203 determines whether the sheet size (sheet width and sheet length) included in the instructed sheet setting can be processed by the printing apparatus 102 with reference to a pre-stored custom sheet information table.

If the sheet size (sheet width and sheet length) included in the instructed sheet setting cannot be processed by the printing apparatus 102, UID 203 executes the following processing.

More specifically, UID 203 changes the sheet size (sheet width and sheet length) so as to be processed by the printing apparatus 102 and fixes the sheet setting.

On the other hand, when the instructed sheet setting method is "sheet ID-oriented setting" or "sheet name-oriented setting", UID 203 executes the following processing.

More specifically, with reference to a pre-stored support sheet information table, UID 203 determines whether the instructed sheet setting is included in a list of printable sheets supported by the printing apparatus 102.

If UID 203 determines that the instructed sheet setting is not included in the list of printable sheets supported by the printing apparatus 102, UID 203 requests GDI 202 to send a list of sheets registered in the OS (hereinafter, referred to as "OS registered sheets").

In response to the request from UID 203, GDI 202 obtains an OS registered sheet list (i.e., a list of OS registered sheets) with reference to a pre-stored registered sheet information table and sends the OS registered sheet list to UID 203.

UID 203 obtains a sheet size (sheet width and sheet length) included in the instructed sheet setting, with reference to the OS registered sheet list sent from GDI 202.

Subsequently, with reference to the support sheet information table, UID 203 determines whether a custom sheet is included in the list of printable sheets supported by the printing apparatus 102. If UID 203 determines that a custom sheet is included in the list of printable sheets supported by the printing apparatus 102, UID 203 changes the sheet setting so as to designate a custom sheet using the obtained sheet size.

On the other hand, if UID 203 determines that no custom sheet is included in the list of printable sheets supported by the printing apparatus 102, UID 203 changes the sheet setting to designate a predetermined sheet printable by the printing apparatus 102.

FIG. 3 illustrates an exemplary support sheet information table 300 stored in UID 203 shown in FIG. 2.

The support sheet information table 300 shown in FIG. 3 is a list of printable sheets supported by the printing apparatus 102. More specifically, the support sheet information table 300 stores information of individual sheets, e.g., sheet ID (ID=1-256), sheet name, sheet size (sheet width and sheet length), and identification of a predetermined sheet. The support sheet information table is prepared for each printing apparatus (i.e., each printer ID) if there are plural printing apparatuses.

FIG. 4 illustrates an exemplary custom sheet information table 400 stored in UID 203 shown in FIG. 2.

The custom sheet information table 400 shown in FIG. 4 stores maximum values and minimum values (sheet width 401, sheet length 402) of the sheets printable by the printing apparatus 102. In the first exemplary embodiment, the units for defining the sheet size are millimeters or can be inches. The custom sheet information table is prepared for each printing apparatus (i.e., each printer ID) if there are plural printing apparatuses.

FIG. 5 illustrates an exemplary registered sheet information table 500 stored in GDI 202 shown in FIG. 2.

The registered sheet information table 500 shown in FIG. 5 is a list of OS registered sheets, which stores information of individual sheets, e.g., sheet ID 501, sheet name 502, and sheet size (sheet width 503 and sheet length 504). In the first exemplary embodiment, the units for defining the sheet width 503 and the sheet length 504 are millimeters or can be inches.

In the print system according to the present embodiment, the host computer 101, functioning as an information processing apparatus, has the following characteristic arrangement.

The host computer 101 is a function processing unit for outputting the print data created by AP 201 to the printing apparatus 102. The host computer 101 includes the following arrangement. First, PGD 206 performs an image processing function for applying image processing to the print data according to sheet conditions set by AP 201, which has a print condition setting function.

UID 203 has a determination function for determining whether the sheet setting set by AP 201 satisfies first sheet conditions based on sheet resource information. The first sheet conditions are predetermined conditions for defining the sheets printable by the printing apparatus 102.

The first sheet conditions are sheet conditions exclusively determined for the printing apparatus 102. On the other hand, second sheet conditions are sheet conditions registered in the OS running on the host computer 101.

If UID 203 determines that the sheet setting does not satisfy the first sheet conditions, UID 203 executes the following processing. UID 203 performs a finalization function for replacing the sheet setting determined by AP 201 with other first sheet conditions based on the sheet resource information so that the printing apparatus 102 can produce a proper print output.

To perform the determination function, if a sheet ID is included in the sheet setting set by the print condition setting function, UID 203 determines whether the sheet ID is included in the sheet resource information as a sheet printable by the printing apparatus.

Furthermore, to perform the determination function, if a sheet name is included in the sheet setting set by the print condition setting function, UID 203 determines whether the sheet name is included in the sheet resource information as a sheet printable by the printing apparatus.

Moreover, to perform the determination function, if a custom sheet size (sheet width and sheet length) is included in the sheet setting set by the print condition setting function, UID 203 determines whether the custom sheet size is within predetermined dimensions (sheet width and sheet length) of a sheet printable by the printing apparatus.

Furthermore, to perform the determination function, if the sheet setting does not satisfy the first sheet conditions, UID 203 determines whether the sheet setting set by AP 201 satisfies second sheet conditions registered in the sheet resource information.

Additionally, to perform the finalization function, if the determination function determines that the sheet setting satisfies the second sheet conditions, UID 203 replaces the second sheet conditions with first sheet conditions included in the sheet resource information and fixes the sheet conditions.

Furthermore, to perform the finalization function, if the sheet setting is a sheet ID, the second sheet conditions are fixed by designating a sheet width and a sheet length as a custom sheet that can be set according to the first sheet conditions.

Moreover, to perform the finalization function, if the sheet setting is a sheet name, the second sheet conditions are fixed by designating a sheet width and a sheet length as a custom sheet that can be set according to the first sheet conditions.

Additionally, to perform the finalization function, if the sheet setting is a custom sheet, the sheet width and the sheet length are fixed within a predetermined sheet size (width and length) for the sheets printable by the printing apparatus.

The second sheet conditions are registered beforehand in the sheet resource information. The operating system can recognize the second sheet conditions from the sheet resource information.

Figure 6:
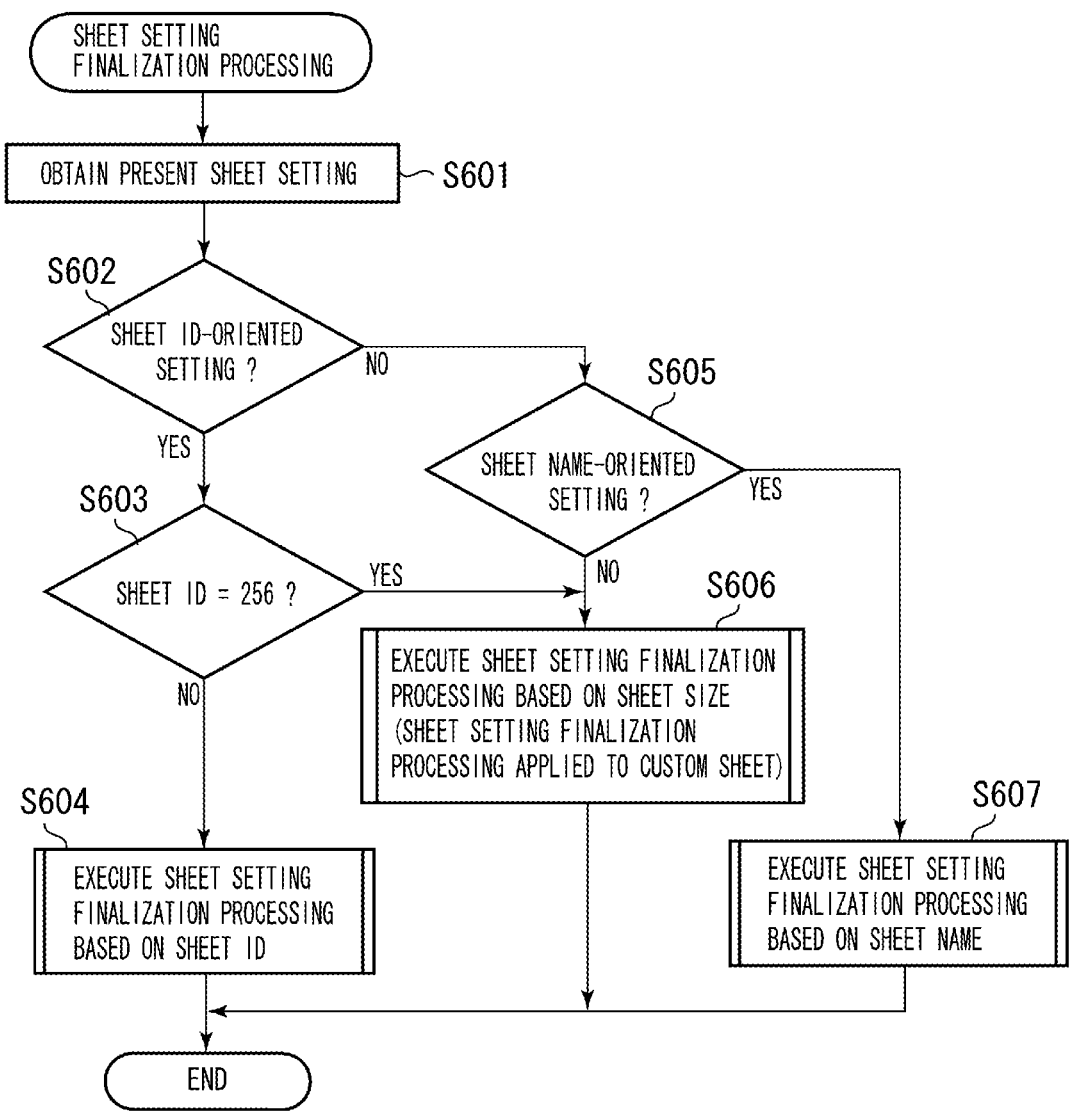
FIG. 6 is a flowchart illustrating an example of a data processing procedure performed in the information processing apparatus according to an exemplary embodiment.

FIG. 6 is a flowchart illustrating an example of a data processing procedure performed in the information processing apparatus according to an exemplary embodiment. The processing shown in FIG. 6 is sheet setting processing (i.e., part of print condition finalization processing) performed by UID 203 as an action by the print system 100. To realize the processing of respective steps, the CPU of the host computer 101 loads a control program from an external storage device into a memory and executes the loaded program.

First, in step S601, UID 203 obtains sheet setting from print setting contents obtained from GDI 202. Next, in step S602, UID 203 determines whether a sheet setting method is "sheet ID-oriented setting" with reference to the sheet setting obtained in step S601.

If UID 203 determines that the sheet setting method is "sheet ID-oriented setting" (i.e., YES in step S602), the processing flow proceeds to step S603. Otherwise, the processing flow proceeds to step S605.

In step S603, UID 203 determines whether a sheet ID is a custom sheet ID (=256) with reference to the sheet setting obtained in step S601. If UID 203 determines that the sheet ID is the custom sheet ID (=256) (YES in step S603), the processing flow proceeds to step S606. Otherwise (NO in step S603), the processing flow proceeds to step S604.

In step S604, UID 203 executes sheet setting finalization processing based on a sheet ID and fixes the sheet setting as print conditions applied to the printing apparatus 102. Then, UID 203 terminates the processing of this routine.

On the other hand, in step S605 (i.e., NO in step S602), UID 203 determines whether the sheet setting method is "sheet name-oriented setting" with reference to the sheet setting obtained in step S601. If UID 203 determines that the sheet setting method is the "sheet name-oriented setting" (i.e., YES in step S605), the processing flow proceeds to step S607. Otherwise (NO in step S605), the processing flow proceeds to step S606.

In step S606, UID 203 executes sheet setting finalization processing based on a sheet size (sheet width and sheet length) and fixes the sheet setting as print conditions applied to the printing apparatus 102. Then, UID 203 terminates the processing of this routine. The sheet setting finalization processing based on a sheet size (sheet width and sheet length) is sheet setting finalization processing applied to a custom sheet.

In step S607, UID 203 executes sheet setting finalization processing based on a sheet name and fixes the sheet setting as print conditions applied to the printing apparatus 102. Then, UID 203 terminates the processing of this routine.

The sheet name can be selected, for example, from A4, A3, and postcard, which represent the size of predetermined sheets physically supplied to the printing apparatus 102.

Figure 7:
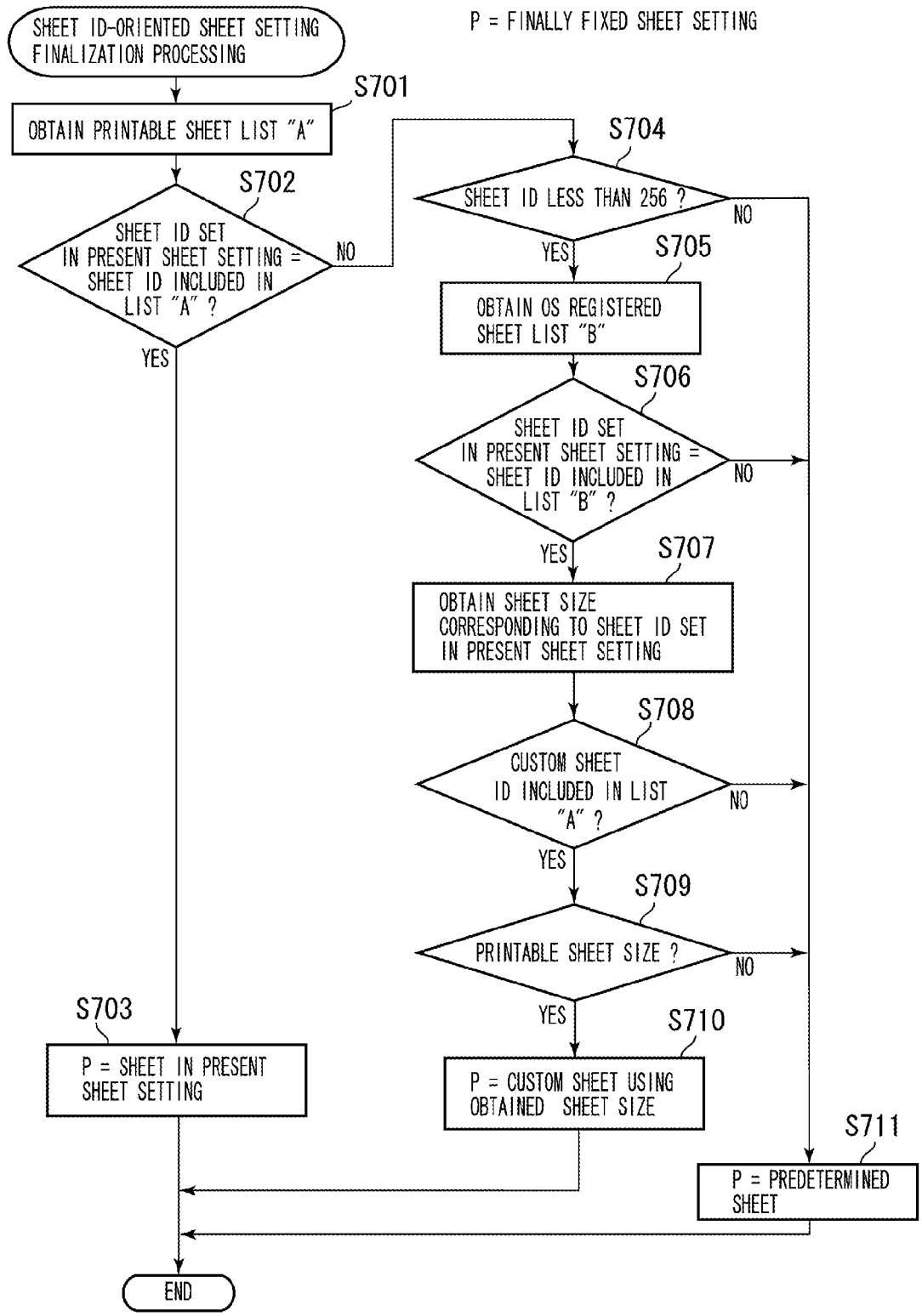
FIG. 7 is a flowchart illustrating an example of a data processing procedure performed in the information processing apparatus according to an exemplary embodiment.

FIG. 7 is a flowchart illustrating an example of a data processing procedure performed in the information processing apparatus according to an exemplary embodiment. The processing shown in FIG. 7 is detailed processing in step S604 of FIG. 6 performed by UID 203, as an action by the print system 100, to fix the sheet setting when the sheet setting method is the "sheet ID-oriented setting." To realize the processing of respective steps, the CPU of the host computer 101 loads a control program from an external storage device into a memory and executes the loaded program.

First, in step S701, UID 203 obtains a list "A" of printable sheets supported by the printing apparatus 102 with reference to the support sheet information table 300 shown in FIG. 3.

Next, in step S702, UID 203 determines whether a sheet ID set in the present sheet setting is included in the list "A" of printable sheets supported by the printing apparatus 102 obtained in step S701.

If UID 203 determines that the sheet ID set in the present sheet setting is included in the list "A" of printable sheets supported by the printing apparatus 102 (i.e., YES in S702), the processing flow proceeds to step S703. Otherwise (NO in step S702), the processing flow proceeds to step S704.

In step S703, UID 203 fixes the present sheet setting as final sheet setting and terminates the processing of this routine.

On the other hand, in step S704, UID 203 determines whether the sheet ID set in the present sheet setting is a sheet ID recognizable by the OS (less than 256). If UID 203 determines that the sheet ID set in the present sheet setting is a sheet ID recognizable by the OS (less than 256) (i.e., YES in step S704), the processing flow proceeds to step S705. Otherwise (NO in step S704), the processing flow proceeds to step S711.

In step S705, UID 203 obtains an OS registered sheet list "B" shown in FIG. 5 from GDI 202.

Next, in step S706, UID 203 determines whether the sheet ID set in the present sheet setting is involved in the OS registered sheet list "B" obtained in step S705. If UID 203 determines that the sheet ID set in the present sheet setting is involved in the OS registered sheet list "B" (i.e., YES in step S706), the processing flow proceeds to step S707. Otherwise (NO in step S706), the processing flow proceeds to step S711.

In step S707, UID 203 obtains a sheet size (sheet width and sheet length) of a sheet corresponding to the sheet ID set in the present sheet setting with reference to the OS registered sheet list "B" obtained in step S705.

Next, in step S708, UID 203 determines whether an ID indicating a custom sheet (=256) is involved in the list "A" of printable sheets supported by the printing apparatus 102 obtained in step S701.

If UID 203 determines that the ID indicating a custom sheet (=256) is involved in the list "A" of printable sheets supported by the printing apparatus 102 (i.e., YES instep S708), the processing flow proceeds to step S709. Otherwise (NO in step S708), the processing flow proceeds to step S711.

In step S709, UID 203 obtains maximum values and minimum values of a sheet size (sheet width and sheet length) printable by the printing apparatus 102 with reference to the custom sheet information table 400 shown in FIG. 4, which is stored in the host computer 101. Then, UID 203 determines whether the sheet size (sheet width and sheet length) obtained in step S707 is within the sheet size (sheet width and sheet length) printable by the printing apparatus 102. UID 203 can access GDI 202 to confirm the sheet size managed by the registered sheet information table 500.

If UID 203 determines that the sheet size (sheet width and sheet length) obtained in step S707 is within the sheet size (sheet width and sheet length) printable by the printing apparatus 102 (i.e., YES in step S709), the processing flow proceeds to step S710. Otherwise (NO in step S709), the processing flow proceeds to step S711.

In step S710, UID 203 fixes a custom sheet using the sheet size (sheet width and sheet length) obtained in step S707 as final sheet setting and terminates the processing of this routine.

On the other hand, in step S711 (i.e., NO in steps S704, S706, S708, and S709), UID 203 obtains a predetermined sheet selected beforehand from the list of printable sheets supported by the printing apparatus 102 with reference to the support sheet information table 300 shown in FIG. 3. Then, UID 203 fixes the predetermined sheet as final sheet setting and terminates the processing of this routine.

Through the above-mentioned processing, when a sheet ID is not included in the support sheet information table 300 of the printing apparatus 102, UID 203 can obtain a sheet width and a sheet length based on the sheet ID if the sheet ID is included in a support sheet list registered by the OS. Then, UID 203 can fix the obtained sheet size as a custom sheet for the printing apparatus 102. Accordingly, even if a sheet ID set in the sheet setting does not correspond to the printing apparatus 102, UID 203 can replace the sheet setting set by AP 201 with a custom sheet for the printing apparatus 102 and continues the print processing.

Figure 8:
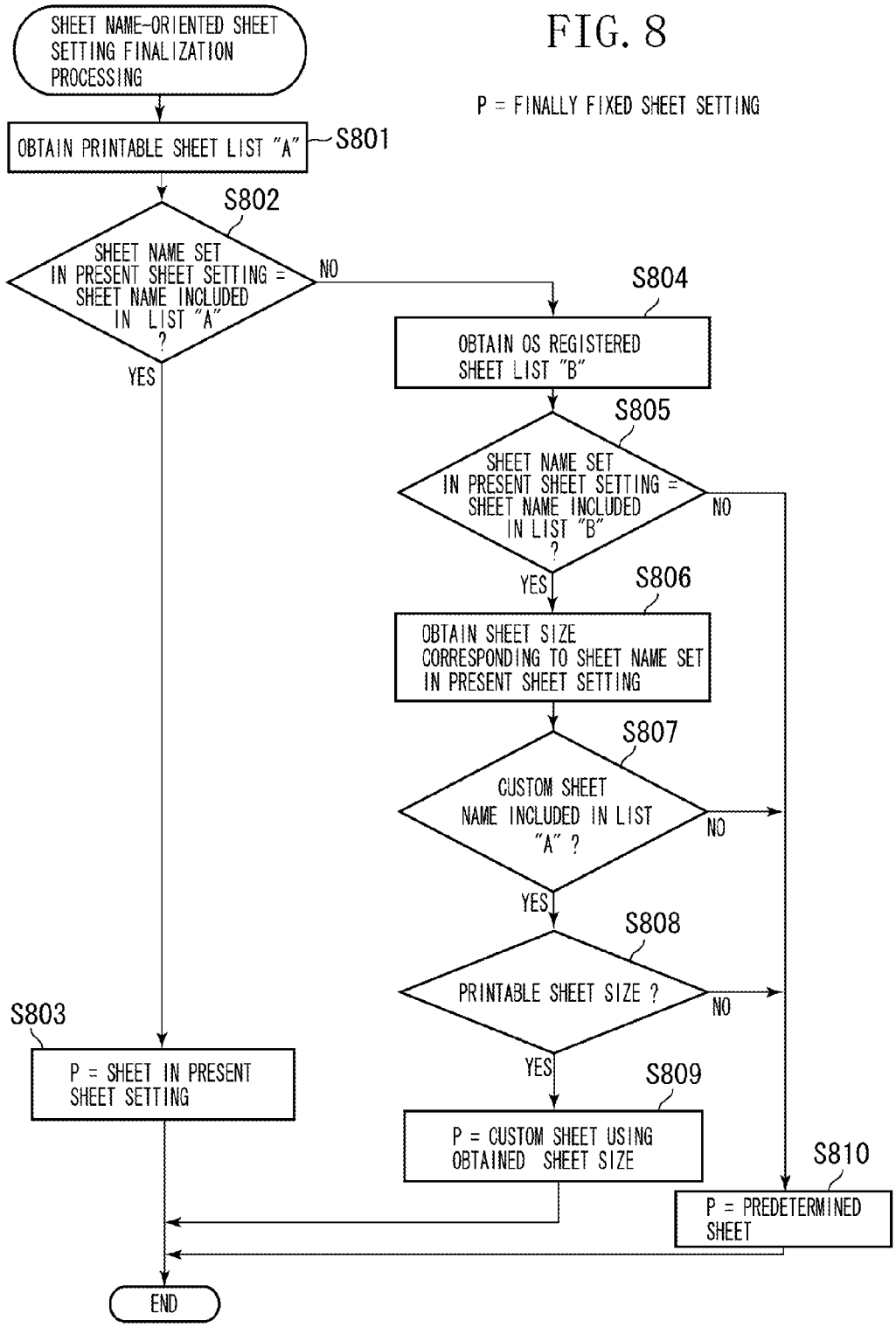
FIG. 8 is a flowchart illustrating an example of a data processing procedure performed in the information processing apparatus according to an exemplary embodiment.

Next, an example of the sheet name-oriented sheet finalization processing is described. FIG. 8 is a flowchart illustrating an example of a data processing procedure performed in the information processing apparatus according to an exemplary embodiment. The processing shown in FIG. 8 is detailed processing in step S607 of FIG. 6 performed by UID 203, as an action by the print system 100, to fix the sheet setting when the sheet setting method is the "sheet name-oriented setting." To realize the processing of respective steps, the CPU of the host computer 101 loads a control program from an external storage device into a memory and executes the loaded program.

First, in step S801, UID 203 obtains the list "A" of printable sheets supported by the printing apparatus 102 with reference to the support sheet information table 300 shown in FIG. 3. Next, in step S802, UID 203 determines whether a sheet name set in the present sheet setting (obtained beforehand in step S601) is involved in the list "A" of printable sheets supported by the printing apparatus 102 obtained in step S801.

If UID 203 determines that the sheet name set in present sheet setting is involved in the list "A" of printable sheets supported by the printing apparatus 102 (i.e., YES in step S802), the processing flow proceeds to step S803. Otherwise (NO in step S802), the processing flow proceeds to step S804.

In step S803, UID 203 fixes the present sheet setting as final sheet setting and terminates the processing of this routine.

On the other hand, in step S804 (i.e., NO in step S802), UID 203 obtains the OS registered sheet list "B" shown in FIG. 5 from GDI 202.

Next, in step S805, UID 203 determines whether the sheet name set in the present sheet setting is involved in the OS registered sheet list "B" obtained in step S805. If UID 203 determines that the sheet name set in the present sheet setting is involved in the OS registered sheet list "B" (i.e., YES in step S805), the processing flow proceeds to step S806. Otherwise (NO in step S805), the processing flow proceeds to step S810.

In step S806, UID 203 obtains a sheet size (sheet width and sheet length) of a sheet corresponding to the sheet name set in the present sheet setting with reference to the OS registered sheet list "B" obtained in step S804.

Next, in step S807, UID 203 determines whether a custom sheet ID (=256) is involved in the list "A" of printable sheets supported by the printing apparatus 102 obtained in step S801. If UID 203 determines that the custom sheet ID (=256) is involved in the list "A" of printable sheets supported by the printing apparatus 102 (i.e., YES in step S807), the processing flow proceeds to step S808. Otherwise (NO in step S807), the processing flow proceeds to step S810.

In step S808, UID 203 obtains maximum values and minimum values of a sheet size (sheet width and sheet length) printable by the printing apparatus 102 with reference to the custom sheet information table 400 shown in FIG. 4. Then, UID 203 determines whether the sheet size (sheet width and sheet length) obtained in step S806 is within the sheet size (sheet width and sheet length) printable by the printing apparatus 102. UID 203 can access GDI 202 to confirm the sheet size managed by the registered sheet information table 500.

If UID 203 determines that the sheet size (sheet width and sheet length) obtained in step S806 is within the sheet size (sheet width and sheet length) printable by the printing apparatus 102 (i.e., YES in step S808), the processing flow proceeds to step S809. Otherwise (NO in step S808), the processing flow proceeds to step S810.

In step S809, UID 203 fixes a custom sheet using the sheet size (sheet width and sheet length) obtained in step S806 as final sheet setting and terminates the processing of this routine.

On the other hand, in step S810 (i.e., NO in steps S805, S807, and S808), UID 203 obtains a predetermined sheet selected beforehand from the list of printable sheets supported by the printing apparatus 102 with reference to the support sheet information table 300 shown in FIG. 3. Then, UID 203 fixes the predetermined sheet as final sheet setting and terminates the processing of this routine.

Through the above-mentioned processing, when a sheet name is not included in the support sheet information table 300 of the printing apparatus 102, UID 203 can obtain a sheet width and a sheet length based on the sheet name if the sheet name is included in the support sheet list registered by the OS. Then, UID 203 can fix the obtained sheet size as a custom sheet for the printing apparatus 102. Accordingly, even if a sheet name set in the sheet setting does not correspond to the printing apparatus 102, UID 203 can replace the sheet setting set by AP 201 with a custom sheet for the printing apparatus 102 and continues the print processing.

Figure 9:
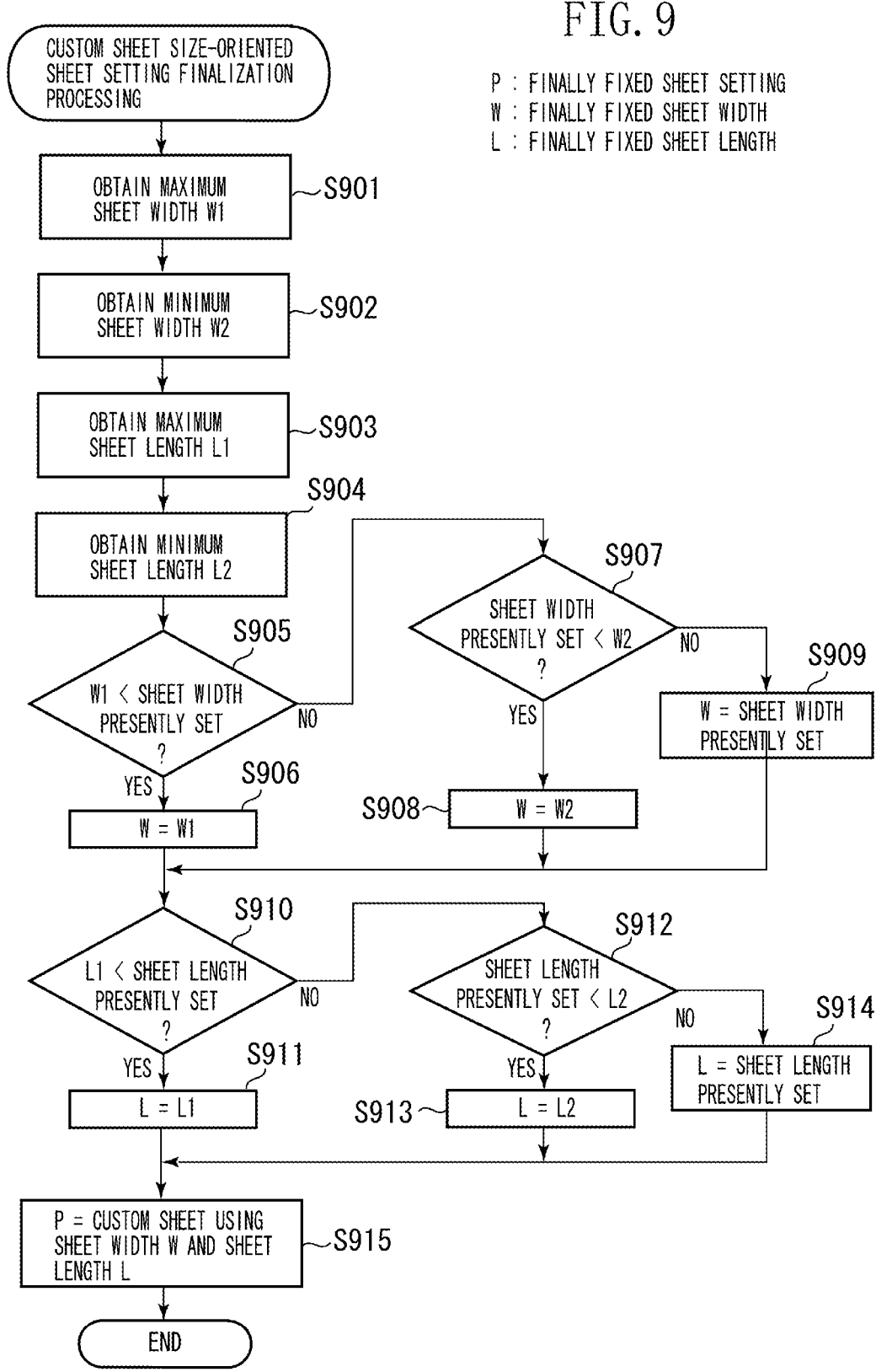
FIG. 9 is a flowchart illustrating an example of a data processing procedure performed in the information processing apparatus according to an exemplary embodiment.

Next, an example of the custom sheet size (sheet width and sheet length)-oriented sheet finalization processing is described. FIG. 9 is a flowchart illustrating an example of a data processing procedure performed in the information processing apparatus according to an exemplary embodiment. The processing shown in FIG. 9 is detailed processing in step S606 of FIG. 6 performed by UID 203, as an action by the print system 100, to fix the sheet setting when the sheet setting method is the "custom sheet size (sheet width and sheet length)-oriented setting." To realize the processing of respective steps, the CPU of the host computer 101 loads a control program from an external storage device into a memory and executes the loaded program.

First, in steps S901 through S904, UID 203 executes the following processing with reference to the custom sheet information table 400 shown in FIG. 4. First, UID 203 obtains a maximum sheet width W1 (step S901) printable by the printing apparatus 102 with reference to the custom sheet information table 400 shown in FIG. 4. Similarly, UID 203 obtains a minimum sheet width W2 (step S902), a maximum sheet length L1 (step S903), and a minimum sheet length L2 (step S904).

Next, in step S905, UID 203 determines whether a sheet width set in the present sheet setting (obtained in step S601) exceeds the maximum sheet width W1 obtained in step S901.

If UID 203 determines that the sheet width set in the present sheet setting exceeds the maximum sheet width W1 (i.e., YES in step S905), the processing flow proceeds to step S906. Otherwise (NO in step S905), the processing flow proceeds to step S907.

In step S906, UID 203 fixes the maximum sheet width W1 as final sheet width W.

On the other hand, in step S907 (i.e., NO in step S905), UID 203 determines whether the sheet width set in the present sheet setting is less than the minimum sheet width W2 obtained in step S902.

If UID 203 determines that the sheet width set in the present sheet setting is less than the minimum sheet width W2 (i.e., YES in step S907), the processing flow proceeds to step S908. Otherwise (NO in step S907), the processing flow proceeds to step S909.

In step S908, UID 203 fixes the minimum sheet width W2 as final sheet width W.

On the other hand, in step S909 (i.e., NO in step S907), UID 203 fixes the sheet width set in the present sheet setting as final sheet width W.

Next, in step S910, UID 203 determines whether a sheet length set in the present sheet setting (obtained in step S601) exceeds the maximum sheet length L1 obtained in step S903.

If UID 203 determines that the sheet length set in the present sheet setting exceeds the maximum sheet length L1 (i.e., YES in step S910), the processing flow proceeds to step S911. Otherwise (NO in step S910), the processing flow proceeds to step S912.

In step S911, UID 203 fixes the maximum sheet length L1 as final sheet length L.

On the other hand, in step S912 (i.e., NO in step S910), UID 203 determines whether the sheet length set in the present sheet setting is less than the minimum sheet length L2 obtained in step S904.

If UID 203 determines that the sheet length set in the present sheet setting is less than the minimum sheet length L2 (i.e., YES in step S912), the processing flow proceeds to step S913. Otherwise (NO in step S912), the processing flow proceeds to step S914.

In step S913, UID 203 fixes the minimum sheet length L2 as final sheet length L.

On the other hand, in step S914 (i.e., NO in step S912), UID 203 fixes the sheet length set in the present sheet setting as final sheet length L.

In step S915, UID 203 fixes, as final sheet setting, a custom sheet using the sheet width W fixed in step S906, S908, or S909 and the sheet length L fixed in step S911, S913, or S914. Then, UID 203 terminates the processing of this routine.

Through the above-mentioned processing, the sheet size (width and length) of a custom sheet set in the sheet setting can be adjusted within a sheet size (width and length) of a custom sheet supported by the printing apparatus 102. Then, UID 203 can fix the adjusted sheet size as a custom sheet for the printing apparatus 102. Accordingly, even if a custom sheet set in the sheet setting does not correspond to the printing apparatus 102, UID 203 can adjust and fix the sheet information as a custom sheet for the printing apparatus 102 and continues the print processing.

As described above, when an application sets an output sheet not supported by a printing apparatus, the first exemplary embodiment can interpret the contents of the output sheet and can execute the print output processing properly. Moreover, the first exemplary embodiment can produce a print output according to user's intent or preference based on the sheet size (sheet width and sheet length) supported by the printing apparatus without requiring re-selection of sheet setting and re-editing of document or image data.

Second Exemplary Embodiment

As described above, the first exemplary embodiment obtains a sheet size (sheet width and sheet length) from the contents of sheet setting when an output sheet not supported by a printing apparatus is set for producing a print output. Then, the first exemplary embodiment determines a custom sheet using the obtained sheet size (sheet width and sheet length) as final sheet setting. As a result, the first exemplary embodiment can execute image processing with a sheet size (sheet width and sheet length) similar to the output sheet set by an application. Furthermore, the first exemplary embodiment can reduce the possibility that print data is lost or a printed image is reduced.

As described above, the first exemplary embodiment can rewrite a sheet setting method from the "sheet ID-oriented setting" or "sheet name-oriented setting" to the "custom sheet size (sheet width and sheet length)-oriented setting."

Therefore, the above-mentioned problems cannot be solved if a custom sheet is not supported by a printing apparatus or in special print conditions.

The following problems may arise if an application sets an output sheet based on a sheet ID. More specifically, the sheet setting cannot be accurately determined in a case where different sheet IDs are allocated to respective printing apparatuses although a printing apparatus supports a predefined sheet having a sheet size corresponding to the output sheet set by the application. Furthermore, when a printing apparatus does not support any custom sheet, the image processing is executed by rewriting the sheet setting into predetermined sheet setting. The print data may be lost and the size of a print image may be reduced. Thus, a print result may not be obtained as intended by a user.

Hence, the second exemplary embodiment obtains a sheet size (sheet width and sheet length) from the contents of sheet setting when an output sheet not supported by a printing apparatus is set for producing a print output. Then, the second exemplary embodiment retrieves a predefined sheet having a sheet size corresponding to the obtained sheet size (sheet width and sheet length) from a list of printable sheets supported by the printing apparatus. If any corresponding predefined sheet is found, the second exemplary embodiment determines the corresponding predefined sheet as final sheet setting.

More specifically, in the determination function of the first exemplary embodiment, if there is any sheet ID that can satisfy the second sheet conditions, the second exemplary embodiment determines whether other first sheet conditions can satisfy the second sheet conditions.

Furthermore, if there is any sheet name satisfying the second sheet conditions, the determination function determines whether other first sheet conditions can satisfy the second sheet conditions.

Furthermore, if other first sheet conditions can satisfy the second sheet conditions, the finalization function fixes the other first sheet conditions as final sheet conditions.

Thus, the second exemplary embodiment can be employed when any sheet ID representing the same sheet conditions is registered even when the first sheet conditions do not include the instructed sheet ID. Similarly, the second exemplary embodiment can be employed when any sheet name representing the same sheet conditions is registered even when the first sheet conditions do not include the instructed sheet name.

Although not described again, the portions already described in the first exemplary embodiment (e.g., FIGS. 1, 2, and 3) are commonly used in the present embodiment. The second exemplary embodiment replaces the processing of FIG. 7 with processing of FIG. 10 and replaces the processing of FIG. 8 with processing of FIG. 11.

More specifically, UID 203 obtains a sheet size (sheet width and sheet length) included in the instructed sheet setting, with reference to the OS registered sheet list sent from GDI 202.

Subsequently, UID 203 determines whether a sheet corresponding to the obtained sheet size is included in the list of printable sheets supported by the printing apparatus 102, with reference to the support sheet information table 300. If a sheet corresponding to the obtained sheet size is included in the list of printable sheets supported by the printing apparatus 102, UID 203 changes the sheet setting so as to designate the corresponding sheet.

On the other hand, if the sheet corresponding to the obtained sheet size is not included in the list of printable sheets supported by the printing apparatus 102, UID 203 determines whether a custom sheet is included in the list of printable sheets supported by the printing apparatus 102 with reference to the support sheet information table 300. If a custom sheet is included in the list of printable sheets supported by the printing apparatus 102, UID 203 changes the sheet setting so as to designate a custom sheet using the obtained sheet size.

On the other hand, if a custom sheet is not included in the list of printable sheets supported by the printing apparatus 102, UID 203 changes the sheet setting so as to designate a predetermined sheet printable by the printing apparatus 102.

Figure 10:
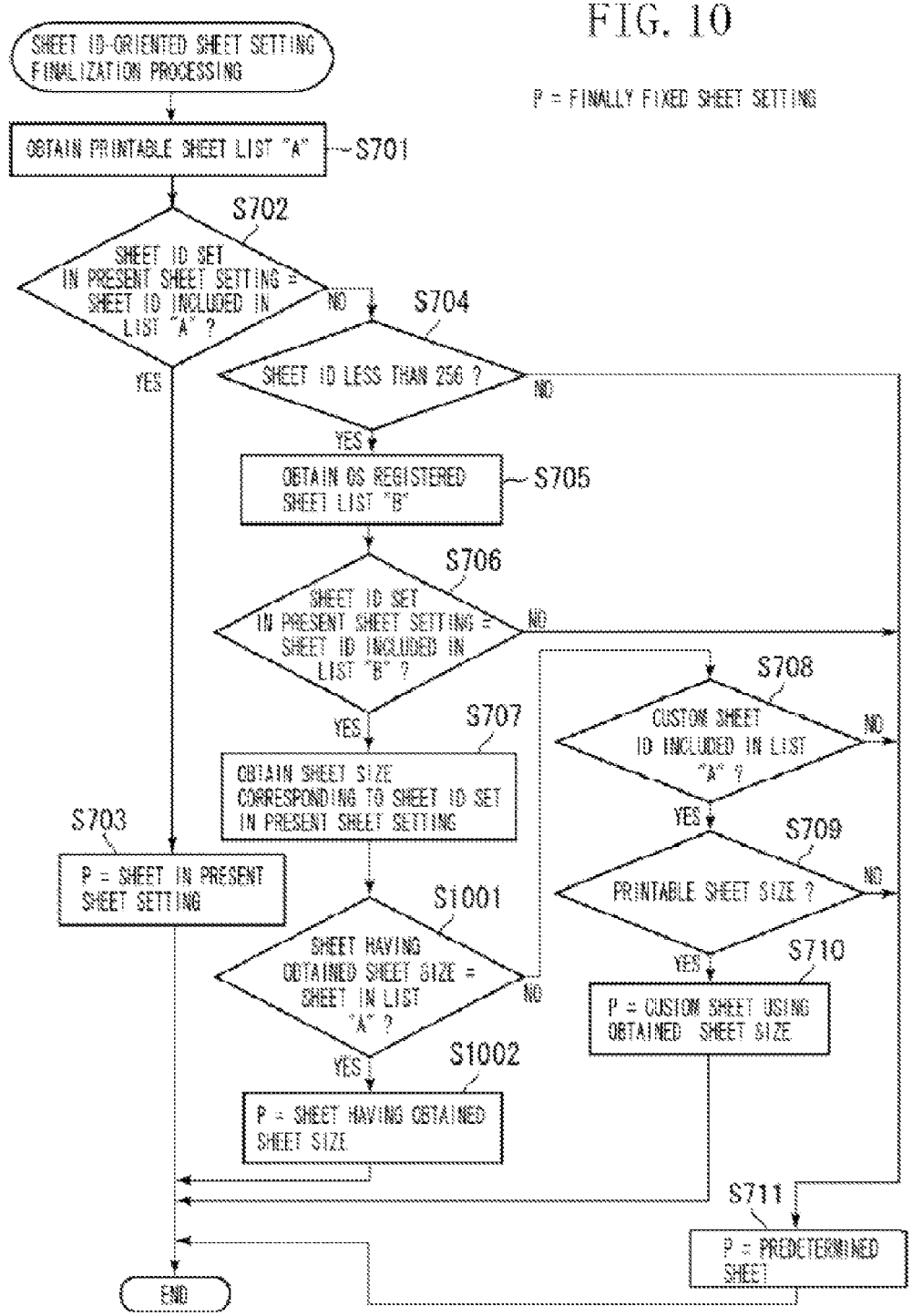
FIG. 10 is a flowchart illustrating an example of a data processing procedure performed in the information processing apparatus according to an exemplary embodiment.

FIG. 10 is a flowchart illustrating an example of a data processing procedure performed in the information processing apparatus according to an exemplary embodiment. The processing shown in FIG. 10 is performed by UID 203, as an action by the print system 100, to fix the sheet setting when the sheet setting method is the "sheet ID-oriented setting." In FIG. 10, steps similar to the processing shown in FIG. 7 described in the first exemplary embodiment are denoted by the same step numbers and will not be described below. To realize the processing of respective steps, the CPU of the host computer 101 loads a control program from an external storage device into a memory and executes the loaded program.

In step S1001, UID 203 determines whether a sheet having the sheet size corresponding to the sheet size (sheet width and sheet length) obtained in step S707 is included in the list of printable sheets supported by the printing apparatus 102 obtained in step S701.

If UID 203 determines that the sheet having the sheet size corresponding to the sheet size (sheet width and sheet length) obtained in step S707 is included in the list of printable sheets supported by the printing apparatus 102 (YES in step S1001), UID 203 executes the following processing (i.e., the processing flow proceeds to step S1002). Otherwise (NO in step S1001), the processing flow proceeds to step S708.

Then, in step S1002, UID 203 fixes the sheet having the sheet size corresponding to the sheet size (sheet width and sheet length) obtained in step S707 as final sheet setting. Then, UID 203 terminates the processing of this routine.

Thus, the present embodiment can solve various problems. For example, the sheet setting cannot be accurately determined in a case where different sheet IDs are allocated to respective printing apparatuses although a printing apparatus supports a predefined sheet having a sheet size corresponding to the output sheet set by AP 201. Furthermore, when a printing apparatus does not support any custom sheet, the image processing is executed by rewriting the sheet setting into predetermined sheet setting. The print data may be lost and the size of a printed image may be reduced. The present embodiment can overcome such problems and can produce a print output as intended by a user.

Figure 11:
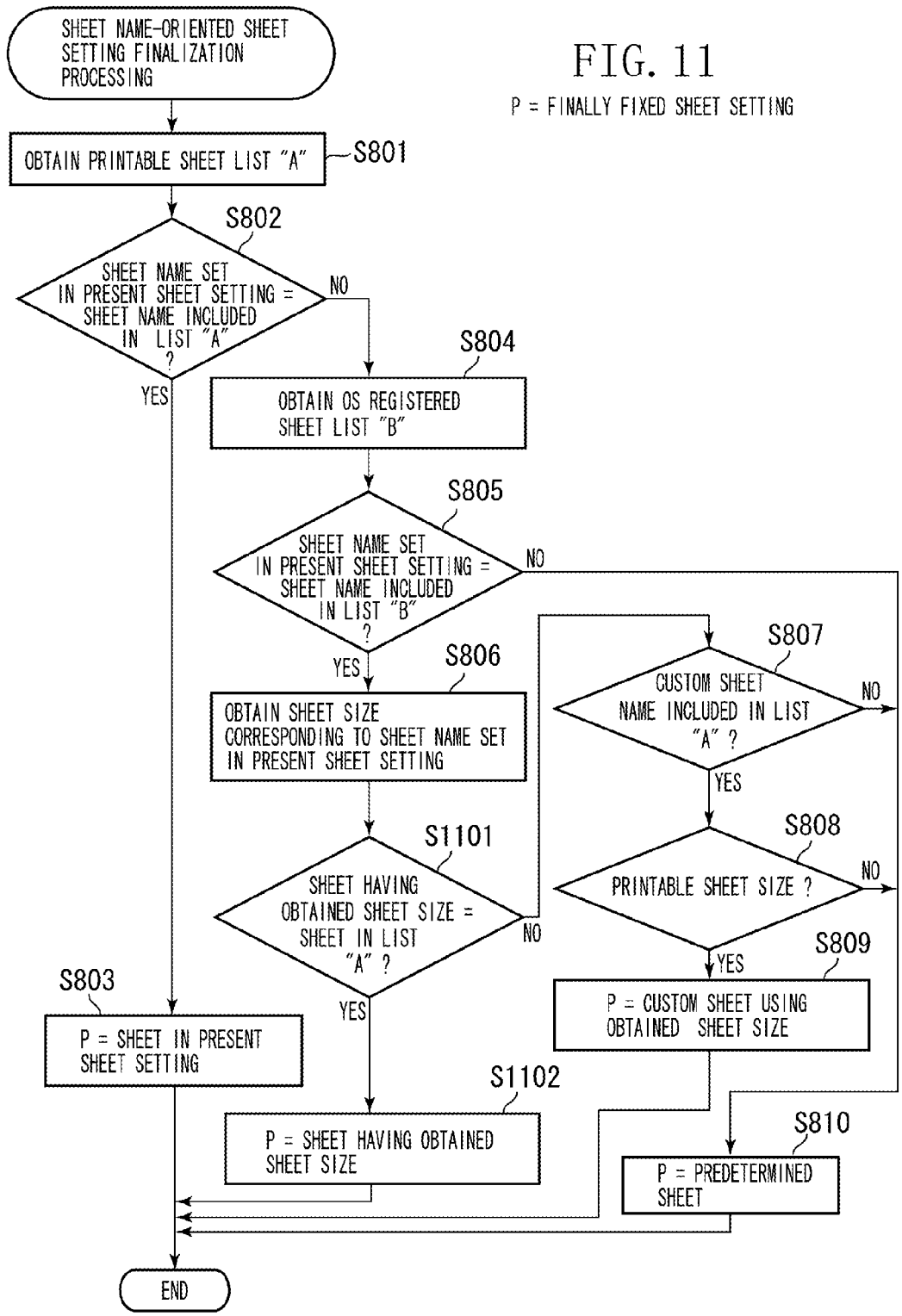
FIG. 11 is a flowchart illustrating an example of a data processing procedure performed in the information processing apparatus according to an exemplary embodiment.

FIG. 11 is a flowchart illustrating an example of a data processing procedure performed in the information processing apparatus according to an exemplary embodiment. The processing shown in FIG. 11 is performed by UID 203, as an action by the print system 100, to fix the sheet setting when the sheet setting method is the "sheet name-oriented setting." In FIG. 11, steps similar to the processing shown in FIG. 8 described in the first exemplary embodiment are denoted by the same step numbers and will not be described below. To realize the processing of respective steps, the CPU of the host computer 101 loads a control program from an external storage device into a memory and executes the loaded program.

In step S1101, UID 203 executes the following determination processing. Namely, UID 203 determines whether a sheet having the sheet size corresponding to the sheet size (sheet width and sheet length) obtained in step S806 is included in the list of printable sheets supported by the printing apparatus 102 obtained in step S801.

If UID 203 determines that the sheet having the sheet size corresponding to the sheet size (sheet width and sheet length) obtained in step S806 is included in the list of printable sheets supported by the printing apparatus 102 (YES in step S1101), UID 203 executes the following processing (i.e., the processing flow proceeds to step S1102). Otherwise (NO in step S1101), the processing flow proceeds to step S807.

Then, in step S1102, UID 203 fixes the sheet having the sheet size corresponding to the sheet size (sheet width and sheet length) obtained in step S806 as final sheet setting. Then, UID 203 terminates the processing of this routine.

Thus, the present embodiment can solve various problems. For example, the sheet setting cannot be accurately determined in a case where different sheet IDs are allocated to respective printing apparatuses although a printing apparatus supports a predefined sheet having a sheet size corresponding to the output sheet set by an application. Furthermore, when a printing apparatus does not support any custom sheet, the image processing is executed by rewriting the sheet setting into predetermined sheet setting. The print data may be lost and the size of a printed image may be reduced. The present embodiment can overcome such problems and can produce a print output as intended by a user.

As described above, even if a custom sheet is not supported by a printing apparatus or in special print conditions, the second exemplary embodiment can produce a print output according to user's intent or preference without requiring re-selection of sheet setting and re-editing of document or image data.

The present invention is not limited to the second exemplary embodiment and can be modified in various ways.

Third Exemplary Embodiment

In the above-described exemplary embodiments, the list of printable sheets supported by the printing apparatus 102 is determined with reference to the support sheet information table 300 shown in FIG. 3. However, the determination method is not limited to the method using the support sheet information table 300.

Furthermore, in the above-described exemplary embodiments, the predetermined sheet selected from the list of printable sheets supported by the printing apparatus 102 is determined with reference to the support sheet information table 300 shown in FIG. 3. However, the determination method is not limited to the method using the support sheet information table 300.

Moreover, in the above-described exemplary embodiments, the range of sheet size (sheet width and sheet length) printable by the printing apparatus 102 is determined with reference to the custom sheet information table 400 shown in FIG. 4. However, the determination method is not limited to the method using the custom sheet information table 400.

Additionally, in the above-described exemplary embodiments, the OS registered sheet list is determined with reference to the registered sheet information table 500 shown in FIG. 5. However, the determination method is not limited to the method using the registered sheet information table 500.

Moreover, the above-described exemplary embodiments execute the following processing when an output sheet instructed for print output is not supported by a printing apparatus.

Namely, if a sheet size obtained from the contents of sheet setting is not within the range of a sheet size supported by a printing apparatus, UID 203 obtains a predetermined sheet from the list of printable sheets supported by the printing apparatus 102. Then, UID 203 fixes the predetermined sheet as final sheet setting. However, the method for fixing the final sheet setting is not limited to the method described in the above-described exemplary embodiments. In this case, the sheet size can be identified with a sheet width and a sheet length.

In addition, UID 203 can execute the processing shown in FIG. 9 for changing the sheet size (sheet width and sheet length) within a sheet size (sheet width and sheet length) supported by a printing apparatus. Then, UID 203 can fix a custom sheet using the changed sheet size (sheet width and sheet length) as final sheet setting.

Furthermore, when an output sheet instructed for print output is not supported by a printing apparatus, the second exemplary embodiment obtains a sheet size from the contents of sheet setting. Then, the second exemplary embodiment retrieves a predefined sheet having a sheet size corresponding to the obtained sheet size from a list of printable sheets supported by a printing apparatus. Then, if the corresponding predefined sheet is found, the second exemplary embodiment determines the predefined sheet as final sheet setting. The setting method for determining final sheet setting can be either the "sheet ID-oriented setting" or the "sheet name-oriented setting." In this case, the sheet size can be identified with a sheet width and a sheet length.

Fourth Exemplary Embodiment

In the first to third exemplary embodiments, AP 201 can select, as a sheet setting method, one of the "sheet ID-oriented setting", the "sheet name-oriented setting", and the "custom sheet size (sheet width and sheet length)-oriented setting." On the other hand, a new OS (e.g., Windows Vista®) is expected to use a print ticket in the setting of print conditions.

Hence, the fourth exemplary embodiment enables AP 201 to execute sheet setting based on a print ticket. In a condition where an output sheet not supported by a printing apparatus is designated by AP 201 to execute print processing, the fourth exemplary embodiment can produce a print output as intended by a user.

The arrangement of FIG. 1 already described in the first to third exemplary embodiments is commonly used in the fourth exemplary embodiment. In FIG. 2, the arrangement of print function processing sections described in the first to third exemplary embodiments are commonly used in the fourth exemplary embodiment. Almost all of the control functions described in the first to third exemplary embodiments are commonly used in the fourth exemplary embodiment. However, the fourth exemplary embodiment includes specific sequential actions to execute a print control function. To this end, the host computer 101 executes the following print control function.

AP 201 requests, via GDI 202, UID 203 to send a list of sheets settable in the printing apparatus 102.

UID 203 receives a request of the list from AP 201 and produces a settable sheet list according to a predetermined format defined by a print schema, with reference to a support sheet information table and a print ticket setting information table which are stored, for example, in a storage device of the host computer 101 or in the hard disk device 103. The support sheet information table and the print ticket setting information table can be updated in response to a version change of AP 201 or UID 203.

Subsequently, UID 203 sends the produced settable sheet list to AP 201.

AP 201 receives the settable sheet list from UID 203 and determines a sheet to be used in the print processing with reference to sheet setting pre-stored in an arbitrary document, user's operation instructions, or an inherent determination method used in AP 201.

Subsequently, AP 201 sets the determined output sheet as part of print conditions in a print ticket. In this case, AP 201 can obtain setting values (XML element) to be set in the print ticket with reference to the settable sheet list received from UID 203.

Subsequently, AP 201 creates or edits an document according to user's operation instructions and instructs print execution of the document data (print data) using the pre-set print ticket.

When GDI 202 receives a print execution instruction from AP 201, GDI 202 sends print conditions set for the printing apparatus 102 (i.e., print ticket) and a print start event to UID 203.

UID 203 receives the print conditions set for the printing apparatus 102 and determines whether the instructed print setting contents can be processed by the printing apparatus 102.

If UID 203 determines that the instructed print setting contents can be processed by the printing apparatus 102, the UID 203 partly changes the print setting contents so as to be processed by the printing apparatus 102 and fixes the print conditions. This processing is referred to as "print condition finalization processing."

Subsequently, AP 201 sends the document data (print data), via GDI 202, to the EMF spool file 204. The EMF spool file 204 stores the document data (print data).

UID 203 causes the EMF spool file 204 to store, beforehand, the print conditions set for the printing apparatus 102.

PP 205 obtains the print setting contents and the print data from the EMF spool file 204, and supplies the print setting contents and the print data to PGD 206 on a page-by-page basis.

PGD 206 applies image processing to the print page data supplied from PP 205, based on a graphics drawing command produced from GDI 202 and print setting contents instructed from GDI 202. Then, PGD 206 produces bit map data (i.e., print image data) for print output.

LM 207 receives the print image data produced from PGD 206 and supplies, to the printing apparatus 102, the received print image data via an interface used for data transfer from the host computer 101 to the printing apparatus 102.

The printing apparatus 102 produces a print output on a sheet 208 based on the print image data supplied from LM 207.

FIG. 12 illustrates an exemplary support sheet information table 1200 stored in UID 203 shown in FIG. 2.

The support sheet information table 1200 shown in FIG. 12 is a list of printable sheets supported by the printing apparatus 102. More specifically, the support sheet information table 1200 stores information of individual sheets, e.g., sheet name, sheet size (sheet width and sheet length), and identification of a predetermined sheet. The support sheet information table 1200 is prepared for each printing apparatus (i.e., each printer ID) if there are plural printing apparatuses.

FIG. 13 illustrates an exemplary print ticket setting information table 1300 stored in UID 203 shown in FIG. 2.

The print ticket setting information table 1300 shown in FIG. 13 is a list describing various information, such as sheet type, name of setting value, and namespace for specifying the setting value, which are required when UID 203 identifies a sheet based on setting values and contents set in a print ticket which is used to set an output sheet. For example, a pro photo provided by manufacturer "A" may be different from a pro photo provided by manufacturer "B." Therefore, the Uniform Resource Identifiers (URI) of manufacturer "A" is described in the print ticket when a pro photo is provided by manufacturer "A." Similarly, the URI of manufacturer "B" is described in the print ticket when a pro photo is provided by manufacturer "B."

FIG. 14 illustrates an exemplary settable sheet list 1400 produced by UID 203 and sent to AP 201 shown in FIG. 2.

According to the settable sheet list 1400 shown in FIG. 14, printable sheets supported by the printing apparatus 102 are described according to a predetermined format defined by a print schema.

In FIG. 14, an encircled portion 1401 describes declaration of a namespace used for correctly interpreting respective XML elements defined in the settable sheet list and an identifier required when the namespace is used in a subordinate element hierarchy in an XML document.

For example, a "JapanLPhoto" provided by manufacturer "A" may be different from a "JapanLPhoto" provided by manufacturer "B." In this case, the namespace URI of manufacturer "A" is described in the print ticket for the "JapanLPhoto" provided by manufacturer "A" while the namespace URI of manufacturer "B" is described in the print ticket for the "JapanLPhoto" provided by manufacturer "B."

In FIG. 14, an encircled portion 1402 describes an element indicating an output sheet prepared as print conditions. According to the example, an element indicating print conditions (e.g., psf.Feature name="psk:PageMediaSize") is defined in the encircled portion 1402. Furthermore, as ancillary information of the element indicating print conditions, the encircled portion 1402 defines a subordinate element indicating a display name usable when a user selects print conditions on a screen of AP 201.

In FIG. 14, an encircled portion 1403 describes an example of a sheet settable as print conditions. According to the example, an element indicating a sheet (e.g., psf:Option name="psk:NorthAmericaLetter") is defined in the encircled portion 1403. Furthermore, as ancillary information of the element indicating a sheet, the encircled portion 1403 defines a subordinate element indicating a display name as well as subordinate element indicating a sheet size (sheet width and sheet length) usable when a user selects print conditions on a screen of AP 201.

FIG. 15 illustrates an exemplary print ticket 1500 set, as print conditions, by AP 201 shown in FIG. 2.

The print ticket 1500 shown in FIG. 15 describes, as setting values of an output sheet, an element indicating a sheet selected from a settable sheet list instructed by UID 203. Furthermore, the print ticket 1500 describes a subordinate element (e.g., "letter") defined as ancillary information of an element indicating a sheet in the settable sheet list instructed by UID 203.

Figure 16:
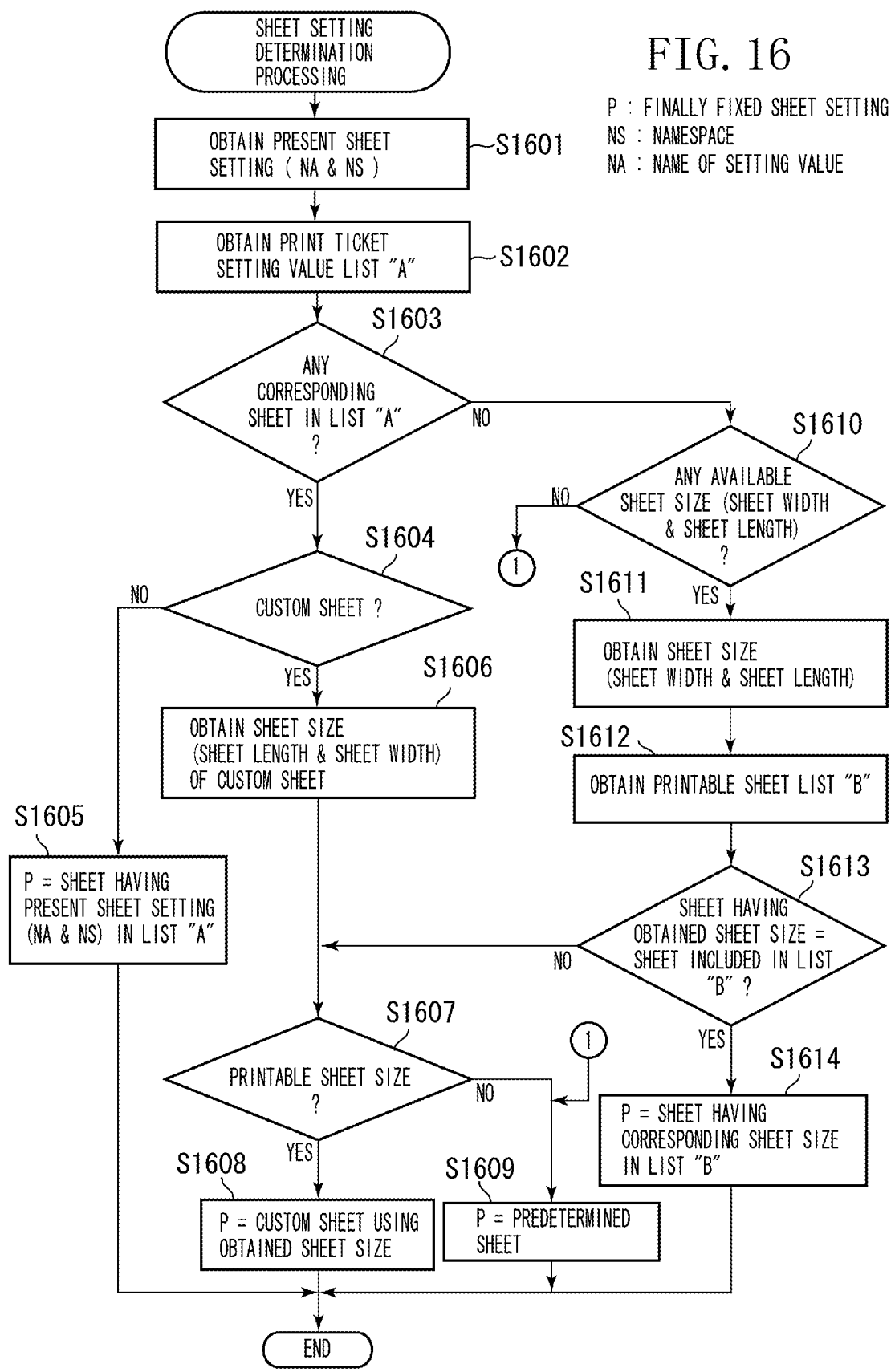
FIG. 16 is a flowchart illustrating an example of a data processing procedure performed in the information processing apparatus according to an exemplary embodiment.

FIG. 16 is a flowchart illustrating an example of a data processing procedure performed in the information processing apparatus according to an exemplary embodiment. The processing shown in FIG. 16 is sheet setting processing (i.e., part of print condition finalization processing) performed by UID 203 as an action by the print system 100. To realize the processing of respective steps, the CPU of the host computer 101 loads a control program from an external storage device into a memory and executes the loaded program.

First, in step S1601, UID 203 obtains present sheet setting from print setting contents obtained from GDI 202. More specifically, UID 203 obtains a setting item name (NA) and a namespace (NS) with reference to an element indicating an output sheet set as present sheet setting in the print ticket.

Subsequently, in step S1602, UID 203 obtains a print ticket setting value list "A" used for specifying a sheet, with reference to the print ticket setting information table 1300 shown in FIG. 13.

Next, in step S1603, UID 203 determines whether a sheet having the present sheet setting (i.e., setting item name and namespace) obtained in step S1601 is included in the print ticket setting value list "A" obtained in step S1602.

If UID 203 determines that a sheet having the present sheet setting is included in the print ticket setting value list "A" (i.e., YES in step S1603), the processing flow proceeds to step S1604. Otherwise (NO in step S1603), the processing flow proceeds to step S1610.

In step S1604, UID 203 determines whether the sheet having the present sheet setting (i.e., setting item name and namespace) is a custom sheet.

If UID 203 determines that the sheet having the present sheet setting (i.e., setting item name and namespace) is a custom sheet (i.e., YES in step S1604), the processing flow proceeds to step S1606. Otherwise (NO in step S1604), the processing flow proceeds to step S1605.

In step S1605, UID 203 fixes the sheet having the present sheet setting (i.e., setting item name and namespace) as final sheet setting and terminates the processing of this routine.

On the other hand, in step S1606, UID 203 obtains a sheet size (sheet width and sheet length) of a custom sheet from the print setting contents obtained from GDI 202. More specifically, UID 203 obtains a sheet size (sheet width and sheet length) of a custom sheet with reference to items indicating the sheet width and the sheet length of a custom sheet set in the print ticket.

Subsequently, in step S1607, UID 203 obtains maximum values and minimum values of a sheet size (sheet width and sheet length) printable by the printing apparatus 102 with reference to the custom sheet information table 400 shown in FIG. 4 stored in the host computer 101. Then, UID 203 determines whether the sheet size (sheet width and sheet length) obtained in step S1606, or in step S1611, is within the sheet size (sheet width and sheet length) printable by the printing apparatus 102.

If UID 203 determines that the sheet size (sheet width and sheet length) obtained in step S1606, or in step S1611, is within the sheet size (sheet width and sheet length) printable by the printing apparatus 102 (i.e., YES in step S1607), the processing flow proceeds to step S1608. Otherwise (NO in step S1607), the processing flow proceeds to step S1609.

In step S1608, UID 203 fixes a custom sheet using the sheet size (sheet width and sheet length) obtained in step S1606, or in step S1611, as final sheet setting and terminates the processing of this routine.

On the other hand, in step S1609, UID 203 obtains a predetermined sheet selected beforehand from the list of printable sheets supported by the printing apparatus 102 with reference to the support sheet information table 1200 shown in FIG. 12. Then, UID 203 fixes the predetermined sheet as final sheet setting and terminates the processing of this routine.

On the other hand, in step S1610 (i.e., NO in step S1603), UID 203 determines whether a subordinate element indicating a sheet size (sheet width and sheet length) as ancillary information of an element indicating a sheet set as present sheet setting is included in the print ticket.

If UID 203 determines that a subordinate element indicating a sheet size (sheet width and sheet length) as ancillary information of an element indicating a sheet set as present sheet setting is included in the print ticket (i.e., YES in step S1610), the processing flow proceeds to step S1611. Otherwise (NO in step S1610), the processing flow proceeds to step S1609.

In step S1611, UID 203 obtains a sheet size (sheet width and sheet length) with reference to the subordinate element indicating a sheet size (sheet width and sheet length) attached as ancillary information of an element indicating a sheet set as present sheet setting in the print ticket.

Subsequently, in step S1612, UID 203 obtains a list "B" of printable sheets supported by the printing apparatus 102 with reference to the support sheet information table 1200 shown in FIG. 12.

Next, in step S1613, UID 203 determines whether a sheet having a sheet size corresponding to the sheet size (sheet width and sheet length) obtained in step S1611 is included in the list of printable sheets supported by the printing apparatus 102 obtained in step S1612.

If UID 203 determines that a sheet having a sheet size corresponding to the sheet size (sheet width and sheet length) obtained in step S1611 is included in the list of printable sheets supported by the printing apparatus 102 (i.e., YES in step S1613), the processing flow proceeds to step S1614. Otherwise (NO in step S1613), the processing flow proceeds to step S1607.

In step S1614, UID 203 fixes the sheet having a sheet size corresponding to the sheet size (sheet width and sheet length) obtained in step S1611 as final sheet setting and terminates the processing of this routine.

As described above, the fourth exemplary embodiment does not require re-selection of sheet setting and re-editing of document or image data, even if a print ticket is used in the sheet setting. The fourth exemplary embodiment can produce a print output as intended by a user.

The first through third exemplary embodiments use the registered sheet information table stored in GDI 202. UID 203 and AP 201 can freely register a sheet into the registered sheet information table and delete a sheet from the table.

For example, at the timing UID 203 is installed in the host computer 101, a sheet inherent to an output apparatus can be registered into the registered sheet information table. Then, at the timing UID 203 is uninstalled from the host computer 101, the sheet inherent to the output apparatus may be deleted from the registered sheet information table.

In this case, if a document to be printed has sheet setting including the sheet ID or sheet name of a sheet deleted from the registered sheet information table, the sheet setting cannot be correctly interpreted. Accordingly, a print result may not be obtained as intended by a user.

However, the fourth exemplary embodiment does not use the registered sheet information table stored in GDI 202 and, therefore, can solve the above-mentioned problem.

The fourth exemplary embodiment has described the setting of print conditions according to the format defined by predefined XML schema. However, any other format defined by other schema language (e.g., DTD, RELAX, and XML Data Reduced) can be used to set print conditions.

Fifth Exemplary Embodiment

An arrangement of a data processing program readable by an information processing apparatus according to an exemplary embodiment of the present invention is described with reference to a memory map shown in FIG. 17.

FIG. 17 is a memory map of a storage medium that can store various data processing programs readable by the information processing apparatus according to an exemplary embodiment.

Although not shown in the drawings, the storage medium can store information relating to management of stored programs (e.g., version information, creator name, etc) and information depending on the OS that reads the programs (i.e., icons discriminately displaying a program).

Furthermore, directories of the storage medium can manage data belonging to various programs. Moreover, the storage medium can store a program for installing various programs on a computer and a decompression program if the installed program is compressed.

A host computer can execute the processing of the exemplary embodiments shown in FIGS. 6 to 11 and 16 by installing programs from an external storage medium using a storage medium (e.g., CD-ROM, flash memory, or FD) or via a network.

Furthermore, software program code for realizing the functions of the above-described exemplary embodiments can be supplied to a system or an apparatus. A computer (or CPU or micro-processing unit (MPU)) in the system or the apparatus can execute the program to operate the devices to realize the functions of the above-described exemplary embodiments.

In this case, the program code itself can realize the functions of the exemplary embodiments. Accordingly, the present invention encompasses the program code installable in a computer when the functions or processes of the exemplary embodiments can be realized by the computer.

The equivalents of programs can be used if they possess comparable functions. Furthermore, the present invention encompasses supplying the program code to a computer, such as a storage (or recording) medium storing the program code. In this case, the type of program can be any one of object code, interpreter program, and OS script data.

A storage medium supplying the program can be selected from any one of a flexible (floppy) disk, a hard disk, an optical disk, a magneto-optical (MO) disk, a compact disk-ROM (CD-ROM), a CD-recordable (CD-R), a CD-rewritable (CD-RW), a magnetic tape, a nonvolatile memory card, a ROM, and a DVD (DVD-ROM, DVD-R).

The method for supplying the program includes accessing a web site on the Internet using the browsing function of a client computer, when the web site allows each user to download the computer program of the present invention, or compressed files of the programs having automatic installing functions, to a hard disk or other recording medium of the user.

Furthermore, the program code constituting the programs of the present invention can be divided into a plurality of files so that respective files are downloadable from different web sites. Namely, the present invention encompasses WWW servers or ftp servers that allow numerous users to download the program files so that the functions or processes of the present invention can be realized on their computers.

Furthermore, enciphering the programs of the present invention and storing the enciphered programs on a CD-ROM or comparable recording medium is an exemplary method when the programs of the present invention are distributed to the users. The authorized users (i.e., users satisfying predetermined conditions) are allowed to download key information from a web site on the Internet. The users can decipher the programs with the obtained key information and can install the programs on their computers. When the computer reads and executes the installed programs, the functions of the above-described exemplary embodiments can be realized.

Furthermore, an operating system (OS) or other application software running on the computer can execute part or all of the actual processing based on instructions of the programs.

Furthermore, the program code read out of a storage medium can be written into a memory of a function expansion board equipped in a computer or into a memory of a function expansion unit connected to the computer. In this case, based on an instruction of the program, a CPU provided on the function expansion board or the function expansion unit can execute part or all of the processing so that the functions of the above-described exemplary embodiments can be realized.

The present invention can be applied to a system including plural devices or can be applied to a single apparatus. Moreover, the present invention can be realized by supplying the program(s) to a system or an apparatus. In this case, the system or the apparatus can read the software program relating to the present invention from a storage medium.

As described above, exemplary embodiments of the present invention can change sheet setting set by an application into appropriate contents so that a printing apparatus can produce a proper print output based on the sheet setting.

Accordingly, when an output sheet not supported by a printing apparatus is designated for print output, the present invention can find an appropriate sheet from output sheets supported by the printing apparatus based on the contents of sheet setting designated by an application and can produce a print output as intended by a user.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2006-042551 filed Feb. 20, 2006 and Japanese Patent Application No. 2006-182580 filed Jun. 30, 2006, which are hereby incorporated by reference herein in their entirety.

What is claimed is:

1. An information processing apparatus, comprising:
a first acquiring unit configured to obtain a print condition including a sheet ID;
a first determination unit configured to determine whether a sheet corresponding to the sheet ID set in the print condition is included in a first list of sheets printable by a printing apparatus stored in a driver;
a second acquiring unit configured to obtain, in response to the first determination unit determining that the sheet corresponding to the sheet ID set in the print condition is not included in the first list, a second list of sheets registered to an operating system, wherein the second list includes a sheet width and a sheet length for each sheet ID;
a second determination unit configured to determine whether the sheet corresponding to the sheet ID set in the print condition is included in the obtained second list registered to the operating system; and
a third acquiring unit configured to obtain, in response to the second determination unit determining that the sheet corresponding to the sheet ID set in the print condition is included in the obtained second list, a sheet width and a sheet length included in the obtained second list corresponding to the sheet ID set in the print condition;
a third determination unit configured to determine whether a sheet having the obtained sheet width and the obtained sheet length is included in the first list; and
a fixing unit configured to configured to fix, in response to the third determination unit determining that a sheet having the obtained sheet width and the obtained sheet length is not included in the first list, a predetermined sheet size as a sheet setting, and fix, in response to the third determination unit determining that a sheet having the obtained sheet width and the obtained sheet length is included in the first list, the obtained sheet width and the obtained sheet length as a sheet setting.

2. The information processing apparatus according to claim 1,
wherein, in response to the sheet setting in the print condition being based on the sheet ID, the sheet setting is fixed based on processing by the first determination unit, the second acquiring unit, the second determination unit, and the fixing unit, and wherein, in response to the sheet setting in the print condition not being based on the sheet ID, the sheet setting is fixed based on a sheet width and a sheet length set in the print condition.

3. The information processing apparatus according to claim 1, further comprising:
a fourth determination unit configured to determine whether the print condition includes a sheet ID,
wherein the first determination unit determines, in response to the fourth determination unit determining that the print condition does not include a sheet ID, whether a sheet corresponding to a sheet name set in the print condition is included in the first list, and
wherein the fixing unit fixes, in response to the first determination unit determining that a sheet corresponding to the sheet name set in the print condition is not included in the first list, a sheet size in the first list indicating a sheet width and a sheet length corresponding to the sheet name set in the print condition as a sheet setting.

4. A method for an information processing apparatus, the method comprising:
   obtaining, as a first obtaining, a print condition including a sheet ID;
   determining, as a first determining, whether a sheet corresponding to the sheet ID set in the print condition is included in a first list of sheets printable by a printing apparatus stored in a driver;
   obtaining, as a second obtaining, in response to determining that the sheet corresponding to the sheet ID set in the print condition is not included in the first list, a second list of sheets registered to an operating system, wherein the second list includes a sheet width and a sheet length for each sheet ID;
   determining, as a second determining, whether the sheet corresponding to the sheet ID set in the print condition is included in the obtained second list registered to the operating system; and
   obtaining, as a third obtaining and in response to determining that the sheet corresponding to the sheet ID set in the print condition is included in the obtained second list, a sheet width and a sheet length included in the obtained second list corresponding to the sheet ID set in the print condition;
   determining, as a third determining, whether a sheet having the obtained sheet width and the obtained sheet length is included in the first list; and
   fixing, in response to determining that a sheet having the obtained sheet width and the obtained sheet length is not included in the first list, a predetermined sheet size as a sheet setting, and fixing, in response to determining that a sheet having the obtained sheet width and the obtained sheet length is included in the first list, the obtained sheet width and the obtained sheet length as a sheet setting.

5. The method according to claim 4,
   wherein, in response to the sheet setting in the print condition being based on the sheet ID, the sheet setting is fixed based on processing by the first determining, the second obtaining, the second determining, and the fixing, and wherein, in response to the sheet setting in the print condition not being based on the sheet ID, the sheet setting is fixed based on a sheet width and a sheet length set in the print condition.

6. The method according to claim 4, further comprising:
   determining, as a fourth determining, whether the print condition includes a sheet ID,
   wherein the first determining includes determining, in response to the fourth determining that the print condition does not include a sheet ID, whether a sheet corresponding to a sheet name set in the print condition is included in the first list, and
   fixing includes fixing, in response to the first determining that a sheet corresponding to the sheet name set in the print condition is not included in the first list, a sheet size in the first list indicating a sheet width and a sheet length corresponding to the sheet name set in the print condition as a sheet setting.

7. A non-transitory computer readable medium storing a program that causes an information processing apparatus to perform a method, the method comprising:
   obtaining, as a first obtaining, a print condition including a sheet ID;
   determining, as a first determining, whether a sheet corresponding to the sheet ID set in the print condition is included in a first list of sheets printable by a printing apparatus stored in a driver:
   obtaining, as a second obtaining, in response to determining that the sheet corresponding to the sheet ID set in the print condition is not included in the first list, a second list of sheets registered to an operating system, wherein the second list includes a sheet width and a sheet length for each sheet ID;
   determining, as a second determining, whether the sheet corresponding to the sheet ID set in the print condition is included in the obtained second list registered to the operating system; and
   obtaining, as a third obtaining and in response to determining that the sheet corresponding to the sheet ID set in the print condition is included in the obtained second list, a sheet width and a sheet length included in the obtained second list corresponding to the sheet ID set in the print condition;
   determining, as a third determining, whether a sheet having the obtained sheet width and the obtained sheet length is included in the first list; and
   fixing, in response to determining that a sheet having the obtained sheet width and the obtained sheet length is not included in the first list, a predetermined sheet size as a sheet setting, and fixing, in response to determining that a sheet having the obtained sheet width and the obtained sheet length is included in the first list, the obtained sheet width and the obtained sheet length as a sheet setting.

8. The non-transitory computer readable medium according to claim 7,
   wherein, in response to the sheet setting in the print condition being based on the sheet ID, the sheet setting is fixed based on processing by the first determining, the second obtaining, the second determining, and the fixing, and wherein, in response to the sheet setting in the print condition not being based on the sheet ID, the sheet setting is fixed based on a sheet width and a sheet length set in the print condition.

9. The non-transitory computer readable medium according to claim 7, the method further comprising:
   determining, as a fourth determining, whether the print condition includes a sheet ID,
   wherein the first determining includes determining, in response to the fourth determining that the print condition does not include a sheet ID, whether a sheet corresponding to a sheet name set in the print condition is included in the first list, and
   fixing includes fixing, in response to the first determining that a sheet corresponding to the sheet name set in the print condition is not included in the first list, a sheet size in the first list indicating a sheet width and a sheet length corresponding to the sheet name set in the print condition as a sheet setting.

* * * * *